(12) United States Patent
Yamamoto et al.

(10) Patent No.: US 11,866,114 B2
(45) Date of Patent: Jan. 9, 2024

(54) CONTROL DEVICE, CREATION METHOD FOR LEARNING MODEL, LEARNING MODEL, COMPUTER PROGRAM AND STORAGE MEDIUM

(71) Applicant: SHIMANO Inc., Sakai (JP)

(72) Inventors: Takashi Yamamoto, Sakai (JP); Fumiaki Yoshida, Sakai (JP)

(73) Assignee: Shimano Inc., Sakai (JP)

( * ) Notice: Subject to any disclaimer, the term of this patent is extended or adjusted under 35 U.S.C. 154(b) by 929 days.

(21) Appl. No.: 16/750,255

(22) Filed: Jan. 23, 2020

(65) Prior Publication Data

US 2020/0247498 A1 Aug. 6, 2020

(30) Foreign Application Priority Data

Jan. 31, 2019 (JP) ................. 2019-016109

(51) Int. Cl.
| | |
|---|---|
| *B62J 45/20* | (2020.01) |
| *B62J 1/08* | (2006.01) |
| *B62J 45/415* | (2020.01) |
| *B62J 45/411* | (2020.01) |
| *B62J 50/22* | (2020.01) |
| *B62J 45/413* | (2020.01) |
| *B62K 25/04* | (2006.01) |
| *B62J 45/416* | (2020.01) |

(52) U.S. Cl.
CPC ................. *B62J 45/20* (2020.02); *B62J 1/08* (2013.01); *B62J 45/411* (2020.02); *B62J 45/413* (2020.02); *B62J 45/416* (2020.02); *B62J 45/4151* (2020.02); *B62J 50/22* (2020.02); *B62K 25/04* (2013.01); *B62J 2001/085* (2013.01); *B62K 2025/044* (2013.01)

(58) Field of Classification Search
CPC ... B62J 1/02; B62J 45/20; B62J 45/413; B62J 50/22; B62J 45/416; B62J 45/4151; B62J 1/08; B62J 2001/085; B62K 25/04; B62K 2025/044
See application file for complete search history.

(56) References Cited

U.S. PATENT DOCUMENTS

| | | | |
|---|---|---|---|
| 8,091,910 B2 | 1/2012 | Hara et al. | |
| 11,603,153 B1* | 3/2023 | Trager | ................... B62J 1/065 |
| 2004/0153227 A1* | 8/2004 | Hagiwara | .......... B60G 17/0195 |
| | | | 701/40 |
| 2015/0197308 A1 | 7/2015 | Butora et al. | |

(Continued)

FOREIGN PATENT DOCUMENTS

| | | |
|---|---|---|
| CN | 106896723 B | 8/2019 |
| DE | 202015104955 U1 | 11/2015 |

(Continued)

*Primary Examiner* — Tony H Winner
(74) *Attorney, Agent, or Firm* — Alleman Hall Creasman & Tuttle LLP

(57) ABSTRACT

A control device for a human-powered vehicle including a control unit is provided. The control device controls a telescopic mechanism in accordance with output information related to controlling the telescopic mechanism that is output from a learning model in association with input information related to traveling of the human-powered vehicle. A method for creating the learning model, the learning model, and a computer-readable storage medium are also provided.

18 Claims, 15 Drawing Sheets

(56) References Cited

U.S. PATENT DOCUMENTS

| | | | |
|---|---|---|---|
| 2018/0362114 A1 | 12/2018 | Lee | |
| 2019/0001779 A1* | 1/2019 | Cheng | B60G 17/0164 |
| 2020/0023703 A1* | 1/2020 | Tsuchizawa | B60G 17/005 |
| 2021/0323623 A1* | 10/2021 | Anderson | B62K 21/22 |
| 2022/0119075 A1* | 4/2022 | Hamed | B62M 9/122 |
| 2022/0266946 A1* | 8/2022 | Hancock | B62J 45/20 |

FOREIGN PATENT DOCUMENTS

| | | |
|---|---|---|
| DE | 102016218499 A1 | 3/2018 |
| DE | 102017127381 A1 | 5/2018 |
| JP | H06202672 A | 7/1994 |
| JP | 2011068253 A | 4/2011 |
| JP | 2014069690 A | 4/2014 |
| JP | 2018089989 A | 6/2018 |
| WO | 2014029759 A1 | 2/2014 |

\* cited by examiner

CONTROL DEVICE, CREATION METHOD FOR LEARNING MODEL, LEARNING MODEL, COMPUTER PROGRAM AND STORAGE MEDIUM

TECHNICAL FIELD

The present invention relates to a control device related to controlling a component of a human-powered vehicle, a method of creating a learning model, a learning model, and a computer-readable storage medium.

BACKGROUND ART

Human-powered vehicles at least partially utilizing human power have been known, including a bicycle, a power-assisted bicycle, an electric bicycle called an e-bike and so on. A human-powered vehicle is provided with multiple components including a transmission, a brake device, a seat post, a suspension or the like. A method of transmitting an operation instruction by a wireless communication signal to each of the multiple components as well as the transmission has been proposed (Patent Document 1).

PRIOR ART DOCUMENT

Patent Document

[Patent Document 1] Japanese Patent Application Laid-Open No. 2018-089989

SUMMARY OF INVENTION

Problems to be Solved by Invention

Out of the multiple components of a human-powered vehicle, a seat post and a suspension having a telescopic mechanism are associated with vibrations that have great influence on the riding comfort of the human-powered vehicle. The riding comfort of the human-powered vehicle can be improved and riding can be made to be more efficient requiring less power through the use of a seat post and suspension to suppress vibrations, and adjusting a spring coefficient thereof to an appropriate value. Proper skill is required for the rider to appropriately control the seat post and the suspension during riding. It would be desirable to provide an optimum automatic control that is based on a traveling condition, a road surface condition, and/or a traveling purpose.

It is an object of the present invention to provide a component control device for optimally performing automatic control of a component having a telescopic mechanism, a method of creating a learning model, a learning model, and a computer-readable storage medium.

Means for Solving Problems

A control device according to a first aspect of the present invention comprises a control unit that controls a telescopic mechanism in accordance with output information related to controlling the telescopic mechanism, wherein the output information is output from a learning model in association with input information related to traveling of a human-powered vehicle.

This achieves automatic control of the telescopic mechanism adapted to various situations or traveling environments in accordance with variety of input information related to traveling of the human-powered vehicle.

In a control device according to a second aspect of the present invention, the telescopic mechanism is a suspension of the human-powered vehicle, and the output information includes at least one of a stroke length, a locked state, a spring force and a damping rate.

This achieves automatic control of the suspension of the human-powered vehicle adapted to various situations or traveling environments in accordance with variety of input information related to traveling of the human-powered vehicle.

In a control device according to a third aspect of the present invention, the suspension includes a first member and a second member movably mounted to the first member, and the input information includes first acceleration output by a first acceleration sensor provided to the first member and second acceleration output by a second acceleration sensor provided to the second member.

This achieves automatic control of the suspension adapted to the ground surface condition in accordance with the information related to the vibration obtained from the acceleration sensor provided to the movable member, in accordance to traveling of the human-powered vehicle.

In a control device according to a fourth aspect of the present invention, the learning model outputs the output information such that a difference between the first acceleration and the second acceleration falls within a predetermined range.

This achieves automatic control of the suspension that allows the absorption of the vibration to fall within an appropriate range while being adapted to the road surface conditions, in accordance to traveling of the human-powered vehicle.

In a control device according to a fifth aspect of the present invention, the telescopic mechanism is a seat post of the human-powered vehicle, and the output information includes at least one of a seat height, an inclination of a seat surface, a position in a front-back direction and a position in a right-left direction.

This achieves automatic control of the seat post of the human-powered vehicle adapted to various situations or traveling environments in accordance with variety of input information related to traveling of the human-powered vehicle.

In a control device according to a sixth aspect of the present invention, the input information includes at least one of traveling information of the human-powered vehicle and traveling environment information of the human-powered vehicle.

This achieves automatic control of the telescopic mechanism adapted to traveling environments, related to traveling of the human-powered vehicle.

In a control device according to a seventh aspect of the present invention, the traveling information includes at least one of a traveling speed of the human-powered vehicle, acceleration of the human-powered vehicle, an attitude of the human-powered vehicle, a cadence of a crank of the human-powered vehicle, a driving force of the human-powered vehicle, a load balance of the human-powered vehicle, a gear ratio of the human-powered vehicle, an operation amount of a brake of the human-powered vehicle and physical information of a user.

This achieves automatic control of the telescopic mechanism adapted to various situations or traveling environments in accordance with variety of input information related to traveling of the human-powered vehicle.

In a control device according to an eighth aspect of the present invention, the traveling environment information of the human-powered vehicle includes at least one of a ground contact state of wheels, a road surface condition, position information and weather.

This achieves automatic control of the telescopic mechanism adapted to various situations or traveling environments in accordance with variety of input information related to traveling of the human-powered vehicle.

In a control device according to a ninth aspect of the present invention, the control unit outputs details of controlling the telescopic mechanism to a notification unit which notifies the user of the details.

This achieves automatic control that allows the user to recognize the details of the control of the telescopic mechanism adapted to various situations or traveling environments in accordance with variety of input information related to traveling of the human-powered vehicle without causing discomfort.

A control device according to a tenth aspect of the present invention further comprises an evaluation unit that evaluates the output information, and the learning model is updated in accordance with an evaluation by the evaluation unit This achieves automatic control of the telescopic mechanism appropriate for the riding characteristics and the preference of the user being the rider of the human-powered vehicle.

In a control device according to an eleventh aspect of the present invention, the evaluation part evaluates the output information in accordance with post-control input information when the input information is obtained after the control part controls the telescopic mechanism.

This achieves automatic control of the telescopic mechanism suited for the riding characteristics and the preference of the user being the rider of the human-powered vehicle.

A control device according to a twelfth aspect of the present invention further comprises an operation unit that accepts a predetermined operation related to the output information, and the output information is evaluated in accordance with a comparison between post-control output information output from the learning model related to the post-control input information and the predetermined operation.

This achieves automatic control of the telescopic mechanism adapted to the details of the operation in accordance with the riding characteristics and the preference of the user of the human-powered vehicle.

In a control device according to a thirteenth aspect of the present invention, the learning model is prepared for each traveling course the human-powered vehicle travels and accepts a selection of the traveling course, the control unit controls the telescopic mechanism in accordance with the output information output in association with the input information from the learning model corresponding to the selected traveling course.

This achieves automatic control of the telescopic mechanism adapted to various situations or traveling environments in accordance with variety of input information for a traveling course of the human-powered vehicle.

A method creating a learning model according to the fourteenth aspect of the present invention comprises: employing, in a case where input information related to traveling of the human-powered vehicle is input, a neural network that outputs output information related to controlling a telescopic mechanism of components of a human-powered vehicle; acquiring input information related to traveling of the human-powered vehicle; identifying output information output by providing the neural network with the acquired input information; and learning, when the telescopic mechanism is controlled in accordance with the identified output information, parameters in an intermediate layer of the neural network by the computer so as to improve the evaluation of a traveling state of the human-powered vehicle.

Thus, the learning model is created such that output information for controlling the telescopic mechanism in accordance with variety of input information related to traveling of the human-powered vehicle is output so as to be adapted to various situations or traveling environments. By using the output information output from the learning model, appropriate automatic control can be achieved depending on the situations and the traveling environments.

A processor configured to execute a learning model according to the fifteenth aspect of the present invention, wherein the learning model comprises: an input layer to be provided with input information related to traveling of a human-powered vehicle; an output layer providing output information related to controlling a component of the human-powered vehicle, the component having a telescopic mechanism; and an intermediate layer having parameters, the intermediate layer being configured to learn to improve an evaluation of a traveling state of the human-powered vehicle as the component is being controlled in accordance with the output information outputted from the output layer, wherein the learning model is configured to execute a calculation in the intermediate layer as the input information is being inputted to the input layer, and to output information related to controlling the component from the output layer.

This achieves appropriate automatic control depending on the situations and the traveling environments by using a trained machine learning model that outputs output information for controlling the telescopic mechanism in accordance with variety of input information related to traveling of the human-powered vehicle.

A computer-readable storage medium according to the sixteen aspect comprises instructions configured to be executed by a processor of a computer, the instructions including: employing, in a case where input information related to traveling of the human-powered vehicle is input, a neural network that outputs output information related to controlling a component having a telescopic mechanism of components of a human-powered vehicle; acquiring input information related to traveling of the human-powered vehicle; identifying output information outputted by providing the neural network with the acquired input information; and learning, in a case where the component is controlled in accordance with the identified output information, parameters in an intermediate layer of the neural network so as to improve the evaluation of comfortability by a rider of the human-powered vehicle.

Thus, the learning model is created by instructions stored on the computer-readable storage medium of the computer such that output information for controlling the telescopic mechanism in accordance with variety of input information related to traveling of the human-powered vehicle is output, so as to be adapted to various situations or traveling environments. By using the output information output by the learning model, appropriate automatic control can be achieved depending on a situation or a traveling environment.

Effects of Invention

The control device for data related to control of a human-powered vehicle according to the present invention can achieve automatic control of the telescopic mechanism adapted to various situations or traveling environment in accordance with variety of input information related to traveling of the human-powered vehicle.

MODE FOR CARRYING OUT INVENTION

The descriptions of the embodiments below are examples of forms that a control device according to the present invention can take, though there is no intention to limit the forms. The control device, the creating method of a trained machine learning model, a trained machine learning model, and a computer-readable storage medium according to the present invention can take forms different from the embodiments, such as forms of modification of each of the embodiments and a combination of at least two or more modifications that do not contradict each other.

In the following description of each of the embodiments, the terms indicating directions, such as front, back, forward, backward, left, right, sideways, upper, lower and so on are used with reference to the directions seen as the user sits in the saddle of a human-powered vehicle.

Embodiment 1

Figure 1:
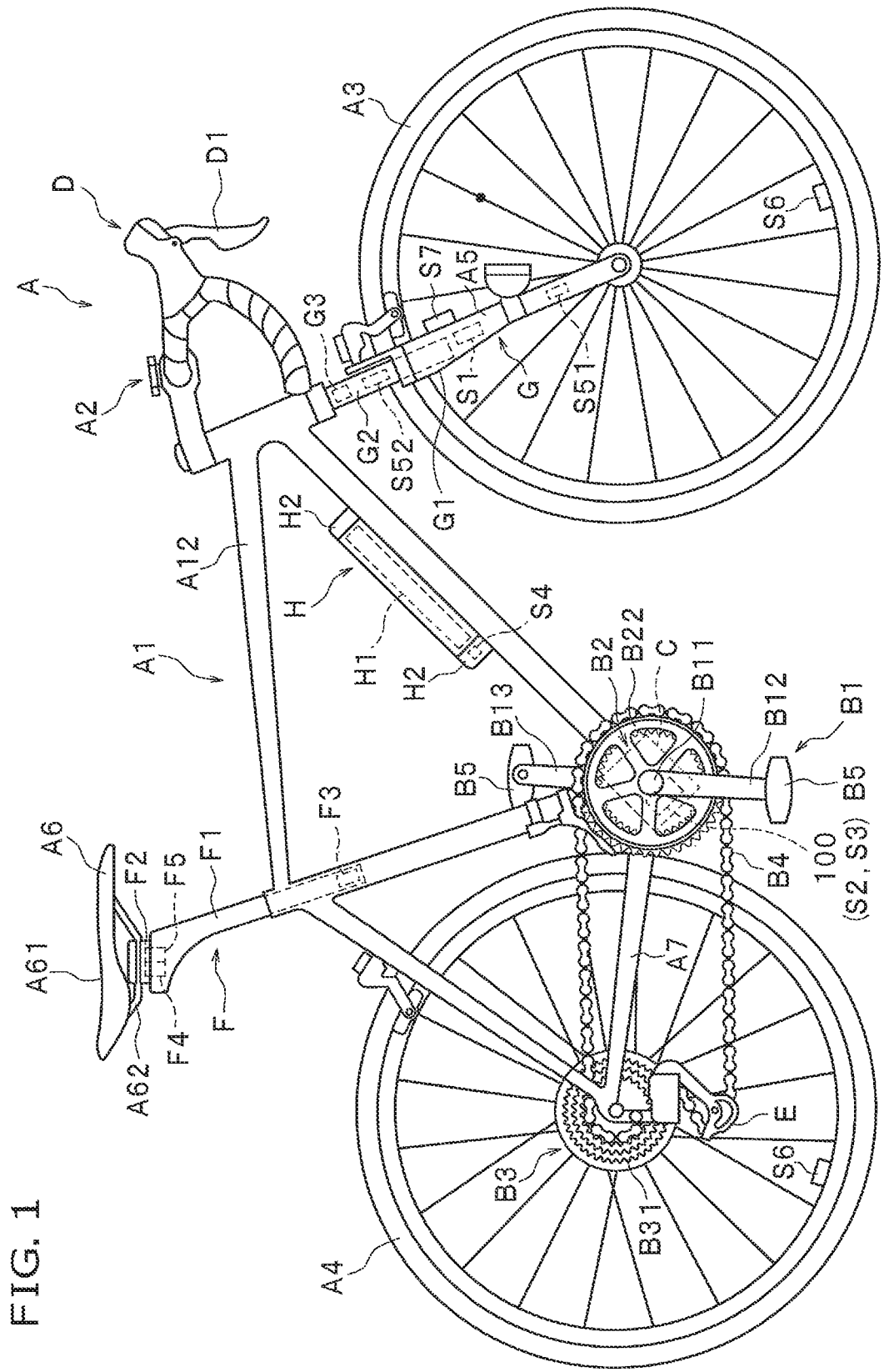
FIG. 1 is a side view of a human-powered vehicle to which a control device is adapted.

FIG. 1 is a side view of a human-powered vehicle A to which a control device according to Embodiment 1 is adapted. The human-powered vehicle A is a road bike including an assist mechanism C that assists the propulsion of the human-powered vehicle A using electric energy. The configuration of the human-powered vehicle A can arbitrarily be changed. In the first example, the human-powered vehicle A does not include the assist mechanism C. In the second example, the kind of the human-powered vehicle A is a city bicycle, a mountain bicycle or a hybrid bicycle. In the third example, the human-powered vehicle A includes the features of the first example and the second example.

The human-powered vehicle A is provided with a main body A1, a handlebar A2, a front wheel A3, a rear wheel A4, a front fork A5, a seat A6 and a derailleur hanger A7. The human-powered vehicle A includes a driving mechanism B, an assist mechanism C, an operation device D, a transmission E, a seat post F, a suspension G, a battery unit H and a control device 100. The human-powered vehicle A includes a speed sensor S1, a cadence sensor S2, a torque sensor S3, an angle sensor S4, an acceleration sensor S5, a pneumatic sensor S6 and an image sensor S7. The main body A1 is provided with a frame A12.

The driving mechanism B transmits a human-powered drive force to the rear wheel A4 by chain drive, belt drive or shaft drive. FIG. 1 illustrates the driving mechanism B of the chain drive. The driving mechanism B includes a crank B1, a first sprocket assembly B2, a second sprocket assembly B3, a chain B4 and a pair of pedals B5.

The crank B1 includes a crank shaft B11, a right crank B12 and a left crank B13. The crank shaft B11 is rotatably supported to the assist mechanism C mounted to the frame A12. The right crank B12 and the left crank B13 are coupled to the crank shaft B11. One of the pair of pedals B5 is rotatably supported to the right crank B12. The other of the pair of pedals B5 is rotatably supported to the left crank B13.

The first sprocket assembly B2 has a first rotation central axis and is coupled to the crank shaft B11 so as to allow for unitary rotation. The first sprocket assembly B2 includes one or more sprockets B22. The crank shaft B11 and the first sprocket assembly B2 are coaxial with each other.

The second sprocket assembly B3 has a second rotation central axis and is rotatably supported to a hub (not shown) of the rear wheel A4. The second sprocket assembly B3 includes one or more sprockets B31.

The chain B4 is engaged with any one of the sprockets B22 of the first sprocket assembly B2 and any one of the sprockets B31 of the second sprocket assembly B3. When the crank B1 rotates forwardly by a human-powered drive force applied to the pair of pedals B5, the first sprocket assembly B2 rotates forwardly together with the crank B1, which transmits the rotation of the first sprocket assembly B2 to the second sprocket assembly B3 via the chain B4, thereby rotating forwardly the rear wheel A4.

The assist mechanism C assists the propulsion of the human-powered vehicle A. As one example, the assist mechanism C transmits torque to the first sprocket assembly B2 to thereby assist the propulsion of the human-powered vehicle A. The assist mechanism C includes an electric motor, for example. The assist mechanism C may include a reducer. The assist mechanism C includes the chain B4 that runs for transmitting a driving force to the rear wheel A4 of the human-powered vehicle A. The assist mechanism C is a part of the components that can be controlled by a signal for assisting the running of the chain B4.

The operating device D includes an operating unit D1 to be operated by the user. One example of the operating unit D1 is one or more buttons. The operating unit D1 receives a predetermined operation related to control of various components such as a predetermined operation of the electric seat post F, a predetermined operation of the electric suspension G and so on, via the operating unit D1. Another example of the operating unit D1 may accept mode switching of the assist mechanism C (power-saving mode, high-power mode, etc.). The operating unit D1 is a brake lever.

The operating device D outputs the operation amount of the brake lever to the control device 100. Every time brake levers provided on left and right handles are inclined sideways, a gear stage or a gear ratio for the transmission E can be changed. The operating device D is connected to communicate with the control device 100 or each of the components so as to transmit and receive signals according to an operation performed on the operating unit D1. In the first example, the operating device D is connected to communicate with components through a communication line or an electric wire that allows for power line communication (PLC). In the second example, the operating device D is connected to communicate with components by a wireless communication unit that allows for wireless communication.

The transmission E can take various forms. In the first example, the transmission E is an external transmission for shifting a coupled state between the second sprocket assembly B3 and the chain B4. In the second example, the transmission E is an external transmission for shifting a coupled state between the first sprocket assembly B2 and the chain B4. In the third example, the transmission E is an internal transmission. In the third example, the movable part of the transmission E includes at least one of a sleeve and a claw of the internal transmission. In the fourth example, the transmission E is a continuously variable transmission. In the fourth example, the movable part of the transmission E includes a ball planetary continuously variable transmission, which is a type of roller-based continuously variable transmission that uses a set of rotating and tilting planetary balls to transfer power between discs of a transmission. The transmission E is a part of the components that can be controlled by a signal for shifting a gear stage.

The seat post F is one of the telescopic mechanisms included in the human-powered vehicle A. The seat post F includes a main post body F1 movably provided to the frame A12 and a head F2 provided on the top end of the main post body F1. The seat post F is a part of the components that can be controlled by setting a seat height as an operation parameter. The seat post F includes an actuator F3 relative to the main post body F1. The seat post F is an electric seat post in the first example. The actuator F3 of the seat post F in the first example is an electric motor. One or more settings are provided for the seat height. The seat post F raises or lowers the main post body F1 relative to the frame A12 depending on a setting of the seat height corresponding to a signal according to an operation transmitted from the operating device D or a signal automatically transmitted from the control device 100. The seat height of the seat A6 is adjusted by raising or lowering of the main post body F1. By using a sensor to detect the protrusion length from the frame A12 of the main post body F1, the seat post F adjusts the protrusion length to take a value corresponding to the setting of the seat height. By using a sensor to detect a relative linear movement amount between a first cylinder and a second cylinder of the main post body F1, the seat post F may adjust the movement amount to correspond to a value corresponding to the setting of the seat height. In the second example, the seat post F is a mechanical seat post. The seat post F in the second example includes a hydraulic seat post or a hydraulic and pneumatic seat post. The seat post F in the second example extends by the force of at least one of a spring or air and contracts by application of human power. In the seat post F of the second example, the actuator F3 is a solenoid valve that opens or closes a passage for flow of oil or air. When receiving a signal corresponding to opening from the operating device D or the control device 100, the seat post F in the second example opens the solenoid valve.

The seat post F in the state where the solenoid valve is opened intends to extend by the force of at least one of the spring and air. In the state where the solenoid valve is closed, the protrusion length from the frame A12 of the main post body F1 or the linear movement amount is not changed. Upon receiving a signal corresponding to opening, the seat post F in the second example opens the solenoid valve for a predetermined time or until it receives a next operation instruction. By using the sensor to detect the protrusion length from the frame A12 of the main post body F1 or the linear movement amount, the seat post F in the second example may be configured to open the solenoid valve until the protrusion length or the linear movement amount reaches a value corresponding to the setting of the seat height. In the third example, the seat post F may be a seat post provided with an opening and closing mechanism including an electric motor and a hydraulic valve or and a pneumatic valve in combination.

The seat A6 is attached on a head F2 of the seat post F. The seat A6 includes a seat surface A61 and a rail A62 extending along the front-back direction. The rail A62 of the seat A6 is fitted into the groove of the head F2 extending along the front-back direction. The position of the seat A6 relative to the post main body F2 in the front-back direction is adjusted in accordance to the position of the head F2 relative to the rail A62. The seat post F includes an actuator F4. In the first example, the actuator F4 is an electric motor for rotating a gear in the head F2 such that the gear is engaged with the rail A62 as a rack rail. The seat post F is a part of the components that can be controlled by setting the position of the seat A6 in the front-back direction as an operation parameter. The seat post F adjusts the position of the head F2 relative to the rail A62 of the seat A6 to match the position corresponding to the set position in the front-back position. The seat post F may be configured to adjust the position in the right and left direction by providing the head F2 with a groove extending in the right and left direction and providing the seat A6 with a rail extending in the right and left direction.

The head F2 of the seat post F is mounted on the main post body F1 so as to enable an angular adjustment in the front-back direction or in the right-left direction. The seat post F includes an actuator F5. The actuator F5 is an electric motor. The seat post F is a component that is able to control the tilt of the seat surface A61 of the seat A6 relative to the main post body F1, i.e., the frame A12 as an operation parameter. The seat post F adjusts the tilt of the seat surface A61 of the seat A6, that is, the tilt relative to the main post body F1 to a set tilt.

Another configuration may be taken to adjust the position of the seat A6 in the front-back direction and in the right-left direction and the tilt of the seat A6. The rail A62 of the seat A6 may be sandwiched between the head F2 and a clamp rotatably provided relative to the head F2 and fixed with a bolt and a nut. In this configuration, the actuator F4 and the actuator F5 are respectively an electric motor for controlling the rotation angle of the clamp and the position of the clamp in the right-left direction and in the front-back direction and an electric motor for tightening or loosening the bolt.

The suspension G is one of the telescopic mechanisms included in the human-powered vehicle A. The suspension G can take various forms. In the first example, the suspension G is a front suspension provided at the front fork A5 for damping the shock applied to the front wheel A3. The suspension G includes a first member G1 attached to the front wheel A3 and a second member G2 movably attached to the first member G1 via a spring or an air spring. The second member G2 is fixed at the main body A1 or a rider part of the handlebar A2. The suspension G includes an actuator G3. The suspension G is a part of the components that can be controlled by setting a stroke length, a locked state, a spring force and a damping rate as operation parameters. The suspension G can change the operation parameters by driving the actuator G3, which is an electric motor, for example. The electric suspension G may be a rear suspension for damping the shock applied to the rear wheel A4. In the case of the rear suspension, the suspension G includes a first member that is attached to the rear wheel A4 and fixed at a seat stay or a chain stay and a second member fixed at a seat tube, a top tube or a down tube of the frame A12. The second member G2 is movable relative to the first member via a spring or an air spring. The suspension G may be provided at the seat post F. The suspension G may include a front suspension and a rear suspension. The suspension G may be any one of a hydraulic suspension and a pneumatic-hydraulic hybrid suspension. The actuator G3 may be a valve for opening or closing a channel for a flow of oil or air. The suspension G is switched between the locked state and the released state in response to a signal according to an operation transmitted from the operating device D or a signal automatically transmitted from the control device 100. The suspension G may be provided with a pump and a valve for adjusting air supply from the pump to an air spring and may be able to change the stroke length to multiple levels in response to a signal. For changing the stroke length, the actuator G3 is a solenoid valve for opening or closing the valve. The suspension G may be able to change a spring force or a damping rate to multiple levels in response to a signal by driving the actuator G3.

The spring force, here, represents the strength as a spring of the suspension G and is a spring characteristic such as a spring constant, for example. If the suspension G is hydraulic or pneumatic, it may have a non-linear spring characteristic depending on its oil pressure or air pressure.

The battery unit H includes a battery H1 and a battery holder H2. The battery H1 is a rechargeable battery including one or more battery cells. The battery holder H2 is fixed at the frame A12 of the human-powered vehicle A, for example. The battery holder H2 may be fixed at the parts of the bicycle other than the frame A12. The battery H1 can be attached to and detached from the battery holder H2. When attached to the battery holder H2, the battery H1 is electrically connected to the assist mechanism C, the transmission E, the actuators F3, F4 and F5 of the seat post F, the actuator G3 of the suspension G and the control device 100.

The speed sensor S1 is fixed at the front fork A5. The speed sensor S1 is a sensor for outputting a signal indicating the traveling speed of the human-powered vehicle A. The speed sensor S1 includes a magnet provided at the front wheel A3 and a main body provided at the front fork A5 for detecting the magnet, for example, and measures a rotation speed.

The cadence sensor S2 is provided so as to measure a cadence of any one of the right crank B12 and the left crank B13. The cadence sensor S2 outputs a signal indicating the measured cadence. The torque sensor S3 is provided so as to measure respective torques applied to the right crank B12 and the left crank B13. The torque sensor S3 outputs a signal indicating the torque measured at least one of the right crank B12 and the left crank B13.

The angle sensor S4 is fixed at the frame A12. The angle sensor S4 is a sensor for outputting respective signals indicating yaw, roll and pitch of the human-powered vehicle A. The angle sensor S4 may output a signal indicating at least any one of the three axes, not limited to all the three axes. The angle sensor S4 is a gyro sensor in the first example. The angle sensor S4 is a direction sensor for outputting a rotation angle in the second example.

The acceleration sensor S5 includes a first acceleration sensor S51 provided to the first member G1 and a second acceleration sensor S52 provided to the second member G2 of the suspension G. The first acceleration sensor S51 and the second acceleration sensor S52 each output a signal indicating acceleration.

The pneumatic sensor S6 is provided to the front wheel A3 or the rear wheel A4 and outputs a signal indicating a value corresponding to tire air pressure.

The image sensor S7 is provided to the frame A12 so as to face the front. In the first example, the image sensor S7 is mounted to the front fork A5 so as to face the front together with a light. In the second example, the image sensor 7 is provided to the handlebar A2. The image sensor S7 outputs video corresponding to the user's field of vision by using a camera module. The image sensor S7 outputs a video signal obtained by photographing an object present in the direction of travel. The image sensor S7 may be a module that is integrally equipped with an image recognition unit for performing recognition processing of separately recognizing a road, a building and another traveling vehicle from the video and that outputs a recognition result.

Figure 2:
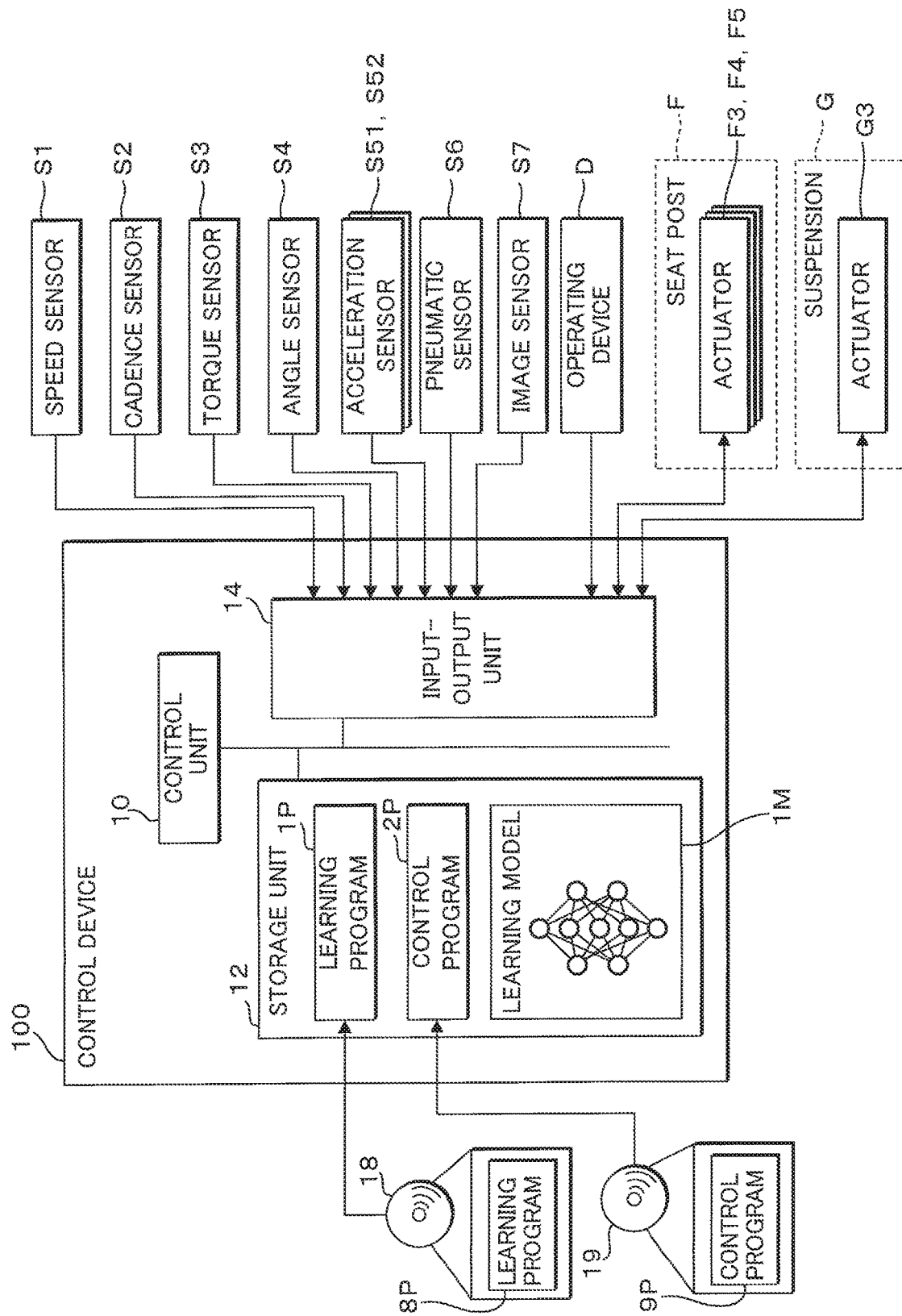
FIG. 2 is a block diagram illustrating an internal configuration of a control unit.

FIG. 2 is a block diagram illustrating the internal configuration of the control device 100. The control device 100 includes a control unit 10, a storage unit 12 and an input-output unit 14. The control device 100 is provided at any position of the frame A12. The control device 100 may be provided between the handlebar A2 and the frame A12. In the first example as illustrated in FIG. 1, the control device 100 is provided between the first sprocket assembly B2 and the frame A12. In the second example, the control device 100 is provided to the battery holder H2.

The control unit 10 includes processing circuitry, e.g. a processor utilizing a central processing unit (CPU) and/or a graphics processing unit (GPU), and executes processing by controlling a learning algorithm described later and the components provided to the human-powered vehicle A using a memory such as a built-in read only memory (ROM), a random access memory (RAM) and so on. The control unit 10 acquires time information at an arbitrary timing by using an internal clock.

The storage unit 12 includes a non-volatile memory such as a flash memory, for example. The storage unit 12 stores a learning program 1P and a control program 2P. The learning program 1P may be included in the control program 2P. The storage unit 12 stores a learning model 1M created by the processing performed by the control unit 10. The learning program 1P may be obtained by reading out a learning program 8P stored in a recording medium 18 and copying it in the storage unit 12. The control program 2P may be obtained by reading out a control program 9P stored in a storage medium 19 and copying it in the storage unit 12.

The input-output unit 14 is connected to each of the sensor group S1-S7 that are mounted to the human-powered vehicle A, the operating device D and the electric actuators F3, F4 and F5 of the seat post F. The input-output unit 14 is also connected to the electric actuators G3 of the suspension G. The control unit 10 acquires a signal indicating a speed from the speed sensor S1 through the input-output unit 14. The control unit 10 acquires a signal indicating a cadence from the cadence sensor S2 and acquires a signal indicating a torque from the torque sensor S3 through the input-output unit 14. The control unit 10 receives an input of a signal indicating an attitude of the human-powered vehicle A, specifically, a signal indicating yaw, roll or pitch from the angle sensor S4 through the input-output unit 14. The control unit 10 acquires signals indicating acceleration from the first acceleration sensor S51 and the second acceleration sensor S52 through the input-output unit 14. The control unit 10 acquires a signal indicating a value corresponding to tire air pressure from the pneumatic sensor S6 through the input-output unit 14. The control unit 10 acquires a video signal or a recognition result in accordance with the video signal from the image sensor S7 through the input-output unit 14. The control unit 10 processes the information acquired from the sensor group S1-S7 as input information. The control unit 10 receives a signal from the operating device D through the input-output unit 14. In the block diagram illustrated in FIG. 2, the input-output unit 14 is connected to the actuators F3, F4, F5 and the actuator G3, though it does not need to be connected to the actuator not to be controlled.

The control unit 10 provides the learning model 1M with input information related to traveling of the human-powered vehicle acquired by the input-output unit 14 and controls the telescopic mechanism in accordance with the output information related to control of the telescopic mechanism such as the seat post F, the suspension G or the like output from the learning model 1M.

The learning model 1M stored in the storage unit 12 is generated in advance under a traveling test environment of the human-powered vehicle A as described below. At the first step, instead of actually travelling the human-powered vehicle A, the learning model 1M may be created by performing a simulation of the model of the human-powered vehicle A. The traveling information of the human-powered vehicle A obtained when the human-powered vehicle A allowing the user to operate the seat post F and the suspension G is actually traveled and the operation results thereof are collected, and the learning model 1M may be learned in accordance with the collected information. The learning model 1M may be created for each of the seat post F and the suspension G that is to be controlled, or may be created so as to output the control information for both of the seat post F and the suspension G.

Figure 3:
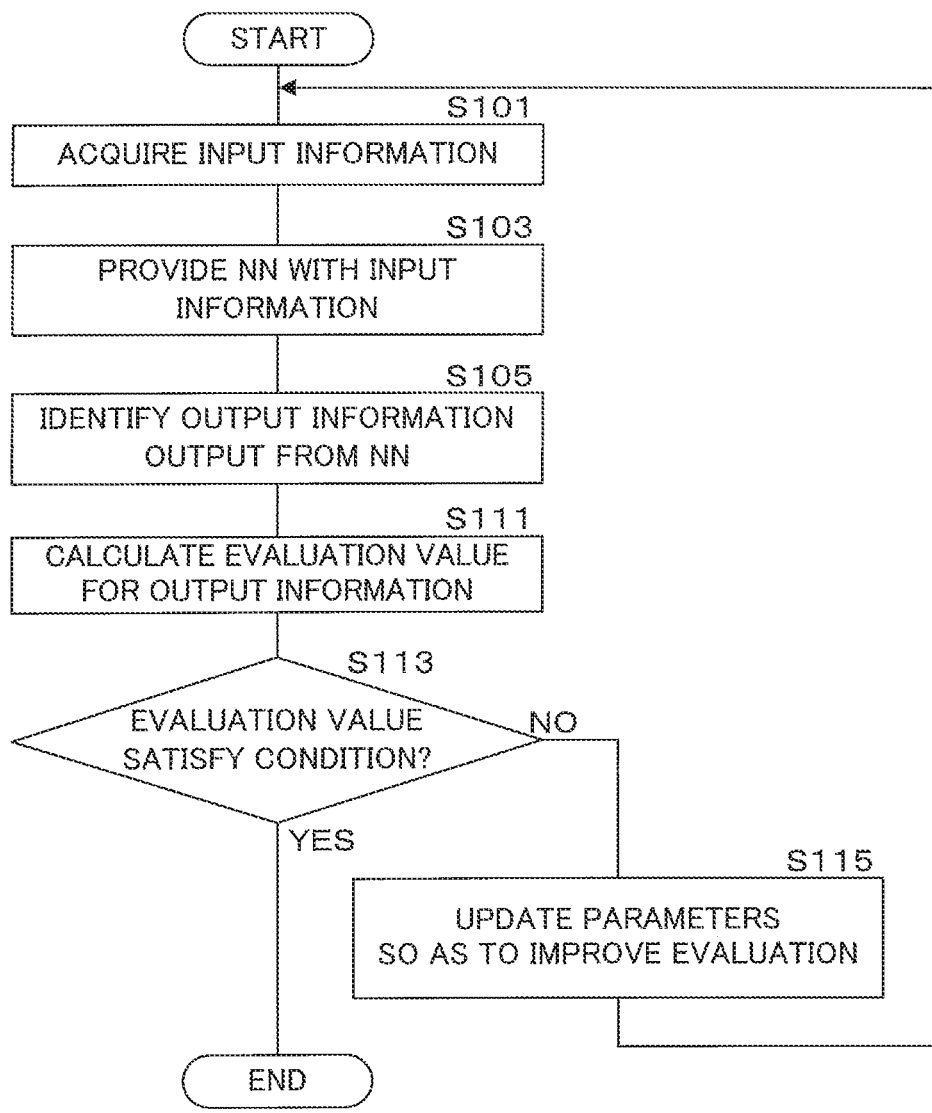
FIG. 3 is a flowchart of one example of a method of creating a learning model.

FIG. 3 is a flowchart of one example of a method of creating the learning model 1M. The control unit 10 executes the method of creating the learning model 1M as will be described below in accordance with the learning program 1P. The learning algorithm in the present embodiment is reinforcement learning (deep Q learning) using a neural network (hereinafter referred to as NN). The learning method may be a supervised learning algorithm or a recurrent neural network using time series data.

The control unit 10 acquires input information related to traveling of the human-powered vehicle A by the input-output unit 14 (step S101).

The control unit 10 provides the NN with the input information acquired at step S101 (step S103) and identifies output information outputted from the NN (step S105).

The control unit 10 calculates an evaluation value for the identified output information (step S111). In the first example, the evaluation value in the traveling state may be derived in accordance with post-control input information that can be acquired after the control in accordance with the output information identified at step S105. In the second example, the evaluation value for the traveling state may be derived in accordance with a comparison between the output information identified at step S105 and a predetermined operation actually performed on the operating device D by the user. The step S111 corresponds to an "evaluation part" in Embodiment 1.

The control unit 10 determines whether or not the evaluation value calculated at step S111 satisfies a condition (step S113). If the evaluation value does not satisfy the condition (S113: NO), the control unit 10 advances the processing to the next step S115.

The control unit 10 uses the evaluation value calculated at step S111 as a consideration, for example, and updates parameters in the intermediate layer of the NN so as to improve the evaluation of the traveling state in accordance with the output information, and then advances the training (step S115). As the details of the learning method, an appropriate method such as a known method in the reinforcement learning including double deep Q-learning, actor-critic, A3C or the like may be selectively employed. The control unit 10 returns the processing to step S101 to continue the learning.

If the determined evaluation value satisfies the condition at step S113 (S113: YES), the control unit 10 ends the learning process.

In the case of creating the learning model 1M with a supervised learning algorithm, if the model user of the human-powered vehicle A drives the vehicle, the control unit 10 acquires input information that can be obtained from the sensor group (S1-S7) and details of the operation performed on the operating device D by the model user, and uses them as training data. In the case where the input information is provided to the NN, the control unit 10 updates the parameters in the NN so that the output information to be outputted matches the details of the operation actually performed by the model user, and advances the learning accordingly.

Figure 4:
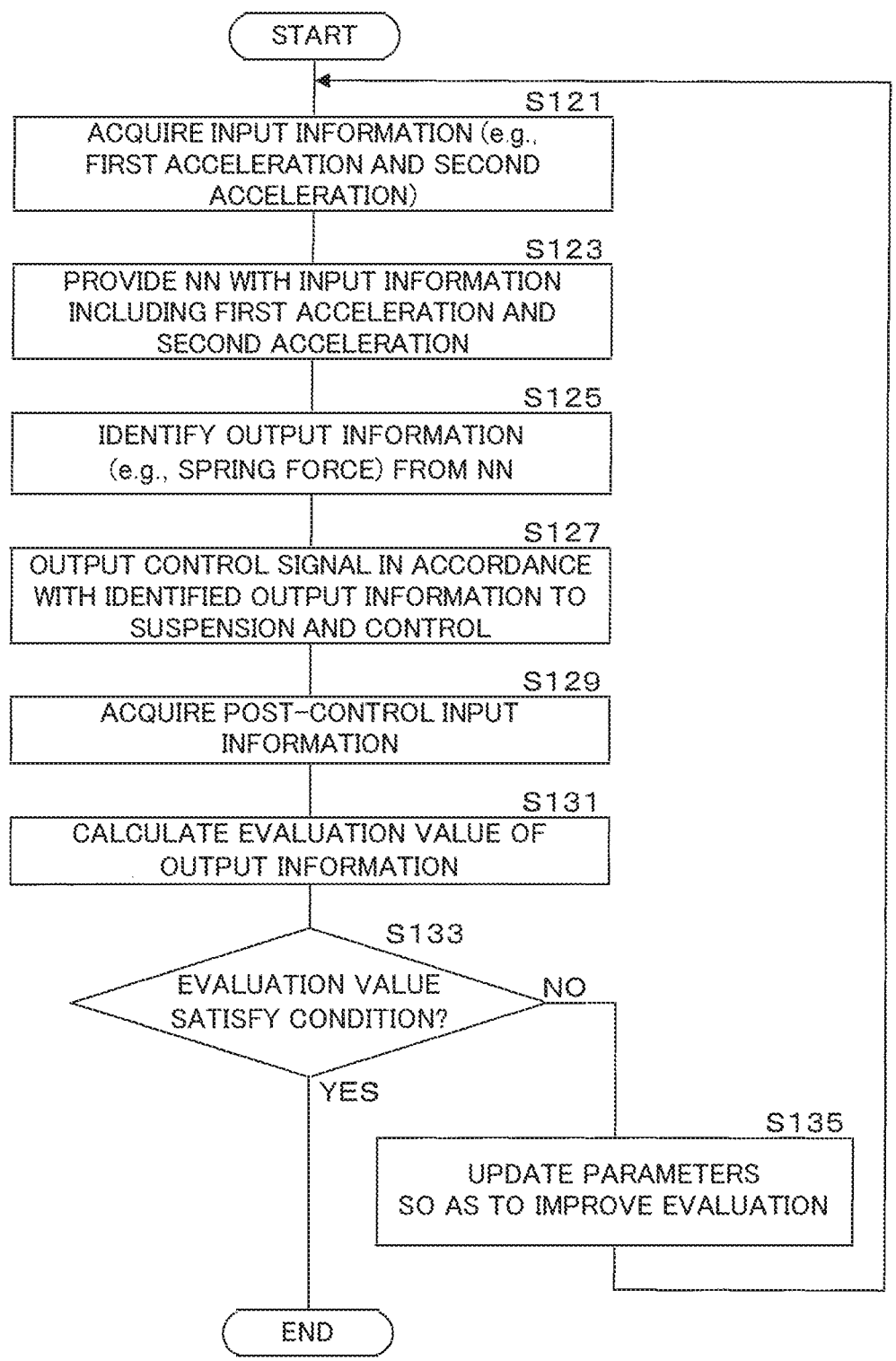
FIG. 4 is a flowchart illustrating a method of creating a learning model in the first example.

The method of creating the learning model 1M shown in the flowchart in FIG. 3 will be described in detail. FIG. 4 is a flowchart of a method of creating the learning model 1M in the first example. In the first example, the object to be controlled is the suspension G. The processing procedure shown in the flowchart in FIG. 4 is a procedure embodies the processing procedure shown by the flowchart in FIG. 3 regarding the control of the suspension G.

The control unit 10 acquires at least first acceleration from the first acceleration sensor S51 and second acceleration from the second acceleration sensor S52 among of the information that can be acquired from the sensor group S1-S7 by the input-output unit 14 (step S121). The control unit 10 may acquire a traveling speed, a cadence, power obtained from the cadence and the torque and an attitude for each of yaw, pitch and roll that can be obtained from the sensor group S1-S7 at step S121. The control unit 10 may acquire a gear ratio obtained from the transmission E or the operating device D of the human-powered vehicle A at step S121. The control unit 10 may acquire an operation amount of the brake lever of the human-powered vehicle A obtained from the operating device D at step S121.

The control unit 10 provides the NN with the input information including at least the first acceleration and the second acceleration (step S123) and identifies output information including at least one of a stroke length, a locked state, a spring force and a damping rate for the suspension G from the NN (step S125).

In the first example, the control unit 10 outputs a control signal in accordance with the output information identified at step S125 to the actuator G3 of the suspension G to thereby control the actuator G3 (step S127) and acquires post-control input information including the controlled first acceleration and second acceleration (step S129). The control unit 10 calculates an evaluation value in accordance with the post-control input information (step S131). At step S131, the control unit 10 calculates as an evaluation value a difference between the first acceleration and the second acceleration that are acquired as post-control input information. The less the difference is, the higher the evaluation value is. The difference may be acceptable if it falls within a predetermined range, not necessarily at a minimal value which is difficult to obtain. At step S131, the control unit 10 may calculate an evaluation value so that a transfer function assuming that the first acceleration is an input and the second acceleration is an output is minimum. At step S131, the control unit 10 may calculate the amplitude or the power value of the second acceleration as an evaluation value. The less the amplitude or the power value is, the higher the evaluation value is. In some cases, the higher the evaluation value is, the larger the amplitude is as if the case for irregular road surface. It may be preferable that the evaluation value is calculated depending on whether or not the difference between the first acceleration and the second acceleration, or the transfer function falls within a predetermined range.

The control unit 10 determines whether or not a condition that the difference calculated as an evaluation value falls within the predetermined range is satisfied (step S133). At step S133, the control unit 10 determines whether or not a condition that the amplitude or the power value of the second acceleration on the frame A12 side is less than a predetermined value is satisfied.

If the condition is not satisfied has been determined at step S133 (S133: NO), the control unit 10 uses the evaluation value calculated at step S131 as a consideration and updates the parameters in the intermediate layer of the NN so as to improve the evaluation of the traveling state, and advances the learning (step S135). At step S135, the control unit 10 updates the parameters to reduce the amplitude of the second acceleration, for example.

If the condition is satisfied has been determined at step S133 (S133: YES), the control unit 10 ends the learning processing.

The learning model 1M is capable of learning to control the suspension G to absorb the vibration of the frame A12 for comfortability by the procedure shown in the flowchart in FIG. 4.

The control unit 10 may derive traveling environment information including at least one of a ground contact state of the wheels, a road surface condition and the weather by a video signal obtained from the image sensor S7 through the input-output unit, 14 and may use the derived traveling environment information as input information at step S121. The road surface condition is a result of classification whether the road surface is smooth like an asphalt-surfaced road or bumpy like a mountain path in accordance with the video signal, for example. Furthermore, the road surface condition may be a result of determination whether or not the road is slippery like wet, frozen or the like. The control unit 10 may acquire the types of the front wheel A3 and the rear wheel A4 and identify the ground contact state of the wheels in accordance with the air pressure obtained from the pneumatic sensor S6, thereby use them as input information. The types of the front wheel A3 and the rear wheel A4 may be different types (product numbers) depending on the size, material, thickness and gutter pattern. The types may be model numbers. In accordance with the association between the air pressure and the ground contact state that are previously stored for each type of the front wheel A3 and the rear wheel A4, the control unit 10 identify the ground contact state for each type of the front wheel A3 and the rear wheel A4. For example, the control unit 10 can identify that the air pressure is the same, but the ground contact states are different between a thick hard front wheel A3 used for a mountain bicycle and a thin front wheel A3 used for a race.

Figure 5:
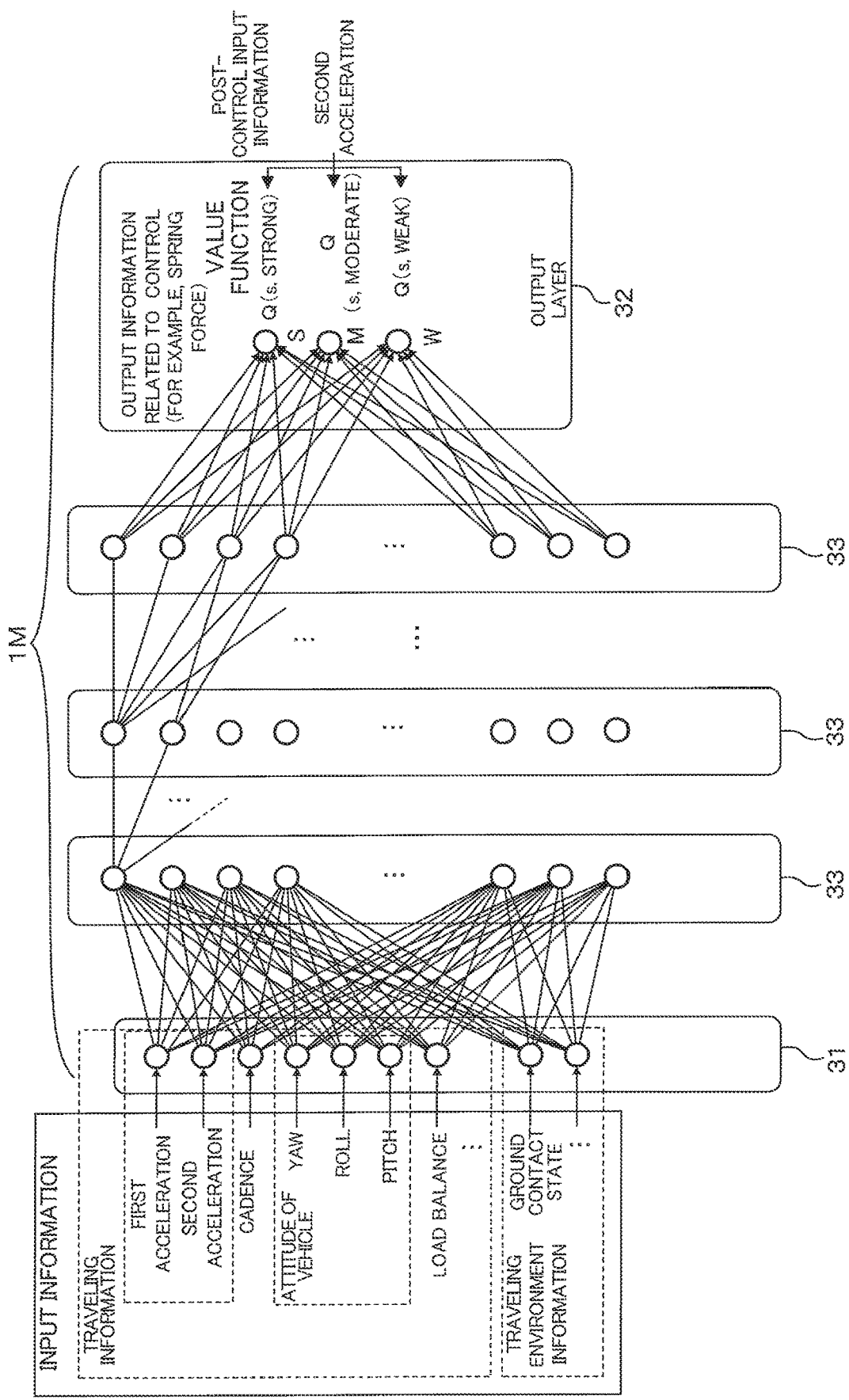
FIG. 5 illustrates the outline of the learning model in the first example.

FIG. 5 illustrates the outline of the learning model 1M in the first example. In the example with reference to FIG. 5, the learning model 1 M from which output information related to control of the suspension G is output will be described. The learning model 1M includes an input layer 31 for inputting input information related to traveling of the human-powered vehicle A, an output layer 32 for outputting output information related to control of the suspension G having the telescopic mechanism among the components of the human-powered vehicle A, and an intermediate layer 33 including parameters learned so as to improve the evaluation of the traveling state if the suspension G is controlled in accordance with the output information output from the output layer 32. If input information related to traveling is input to the input layer 31, calculation is executed in the intermediate layer 33 using the learned parameters, and output information related to control of the suspension G is output from the output layer 32.

In the example in FIG. 5, the input layer 31 is provided with at least first acceleration obtained from the first acceleration sensor S51 and second acceleration obtained from the second acceleration sensor S52. The input layer 31 may be provided with a cadence obtained from the cadence sensor S2. The input layer 31 may be provided with power obtained by calculation using the torque and the cadence.

Other than the above description, the data of an attitude of the human-powered vehicle A obtained from the angle sensor S4 may be input to the input layer 31. The data of the attitude is information indicating the inclination of the human-powered vehicle A. The inclination is represented by a yaw component having an axis in the vertical direction, a roll component having an axis in the front-back direction of the human-powered vehicle A, and a pitch component having an axis in the right-left direction of the human-powered vehicle A.

The input layer 31 may be provided with a load balance of the human-powered vehicle A. The load balance may be a numerical value obtained by the control unit 10 from the ratio between the pressure of the front wheel A3 and the pressure of the rear wheel A4 obtained from the pneumatic sensor S6. The load balance may be evaluated by using a vector sensor or a strain gauge, or obtained by using different types of sensors in combination according to a design. The load balance may also be a result of determination whether the load balance is closer to the front or closer to the back under the test run environment, in a case where piezoelectric sensors are provided at the front wheel A3, the rear wheel A4, the seat A6 and the handlebar A2 of the human-powered vehicle A.

A signal indicating a ground contact state of the front wheel A3 or the rear wheel A4 obtained from the pneumatic sensor S6 may be input to the input layer 31. In other words, the signal indicating the ground contact state is traveling environment information. The signal indicating the ground contact state corresponds to a numerical value representing the change of size of the contact area as the air pressure increases. The signal indicating the ground contact state may be signals representing respective sizes of large, medium and small of the contact area. As another example of the traveling environment information, a signal indicating a road surface condition obtained by performing image processing on the video signal obtained from the image sensor S7 may be input to the input layer 31. The signal indicating the road surface condition is, for example, a signal representing a road surface condition such as a determination result whether the road is unpaved or paved, a determination result whether the road is uphill or downhill, or whether the road is slippery or not.

The output layer 32 outputs a spring force of the suspension G. The output layer 32 specifically outputs information indicating evaluations for actions of the spring force classified as strong, moderate and weak, that is, a spring force associated with higher ride comfortability. In the figures, the output layer is shown to include a plurality of vectors Q, each of which contains a confidence score s and an output classification (e.g., strong, moderate, and weak or high, middle, and low). It will be appreciated that other classifications may be used. The control unit 10 can select the spring force with the highest evaluation in accordance with the evaluated actions value of the output information, and output the selected one to the suspension G. For the spring force output from the output layer 32, a higher evaluation is given to smaller vibration measured by the second acceleration.

As the reinforcement learning progresses, the learning model 1M, can obtain the control information of the suspension G for improving riding comfortability depends on the traveling situation and the road surface condition of the human-powered vehicle A.

Figure 6:
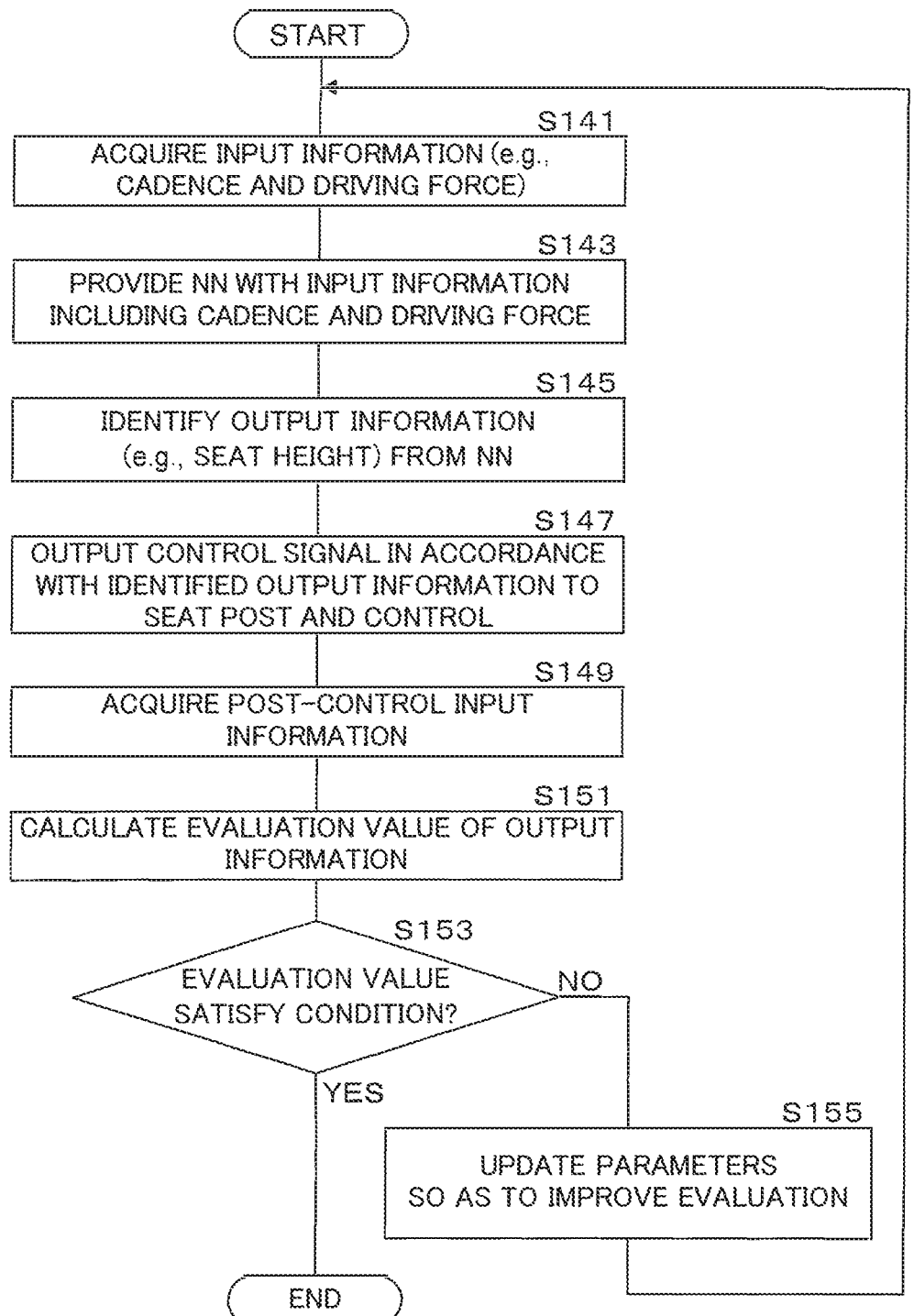
FIG. 6 is a flowchart of a method of creating a learning model in the second example.

FIG. 6 is a flowchart of a method of creating a learning model 1M in the second example. In the second example, an object to be controlled is the seat post F. The processing procedure shown in the flowchart in FIG. 6 is a procedure where the processing procedure shown in the flowchart in FIG. 3 used to control the seat post F.

The control unit 10 acquires at least one of a traveling speed from the speed sensor S1, a cadence and driving force obtained from the cadence and the torque among the information that can be acquired from the sensor group S1-S7 through the input-output unit 14 (step S141). At step S141, the control unit 10 may acquire an attitude for each of yaw, pitch and roll of the human-powered vehicle A. The control unit 10 may acquire a gear ratio obtained from the transmission E or the operating device D of the human-powered vehicle A at step S141. The control unit 10 may acquire an operation amount of the brake lever of the human-powered vehicle A obtained from the operating device D at step S141.

The control unit 10 provides the NN with the input information including at least one of the traveling speed, the cadence and the driving force (step S143) and identifies output information including at least one of a seat height of the seat A6, a tilt of the seat surface A61 and a position of the seat A6 in the front-back direction and in the right-left direction for the seat post F outputted from the NN (step S145).

In the second example, the control unit 10 outputs a control signal in accordance with the output information identified at step S145 to the actuators F3, F4 and F5 of the seat post F to control the actuators (step S147) and acquires post-control input information including the torque, for example, after control (step S149). The control unit 10 calculates an evaluation value in accordance with the post-control input information (step S151). At step S151, the control unit 10 acquires the torque as post-control input information and calculates a torque or a driving force as an evaluation value. The smaller the torque or the driving force is, the more easily the user pedals the human-powered vehicle, and evaluated higher.

The control unit 10 determines whether a condition that the torque or the driving force calculated at step S151 is less than a predetermined value is satisfied (step S153) or not.

If the determined condition is not satisfied at step S153 (S153: NO), the control unit 10 uses the evaluation value calculated at step S151 as a consideration and updates the parameters in the intermediate layer of the NN so as to improve the evaluation of the traveling state, and advances the learning (step S155). At step S155, the control unit 10 updates the parameters to reduce the torque or the driving force, for example.

If the determined condition is satisfied at step S153 (S153: YES), the control unit 10 ends the learning process.

In the second example, without performing steps S147 and S149, the control part 10 may compare the output information identified at step S145 and predetermined operation actually performed on the operating device D by the user, and may calculate the degree of gap in accordance with the comparison as an evaluation value at step S151. For example, if the user actually operates the operating device D to adjust the seat height of the seat post F and the position of the seat post F in the front-back direction and in the left and right direction, the control unit 10 may advance the learning such that the output information output from the NN matches the details of the control actually performed. In this case, the details of the operation performed on the operating device D are training data, and the learning is advanced using supervised learning.

In the second example, as the learning progresses, control information for the seat post F for easily pedaling and driving the human-powered vehicle A can be obtained by using the learning model 1M. By the reinforcement learning in accordance with the information such as the traveling speed, the image information, the tilt, the power or the like, the saddle is automatically adjusted to the optimum position depending on the situation.

In the second example as well, the control unit 10 may derive traveling environment information including at least one of a ground contact state of the wheels, a road surface condition and the weather by the video signal obtained from the image sensor S7 through the input-output unit 14, and may use the derived traveling environment information as input information at step S141. The road surface condition is a result of classification whether the road surface is smooth like an asphalt-surfaced road or bumpy like a mountain path in accordance with the video signal, for example. The road surface condition may be a result of determination whether or not the road is slippery like wet, frozen or the like. The control unit 10 may acquire the types of the front wheel A3 and the rear wheel A4 and identify the ground contact state of the wheels in accordance with the air pressure obtained from the pneumatic sensor S6 to use them as input information.

Figure 7:
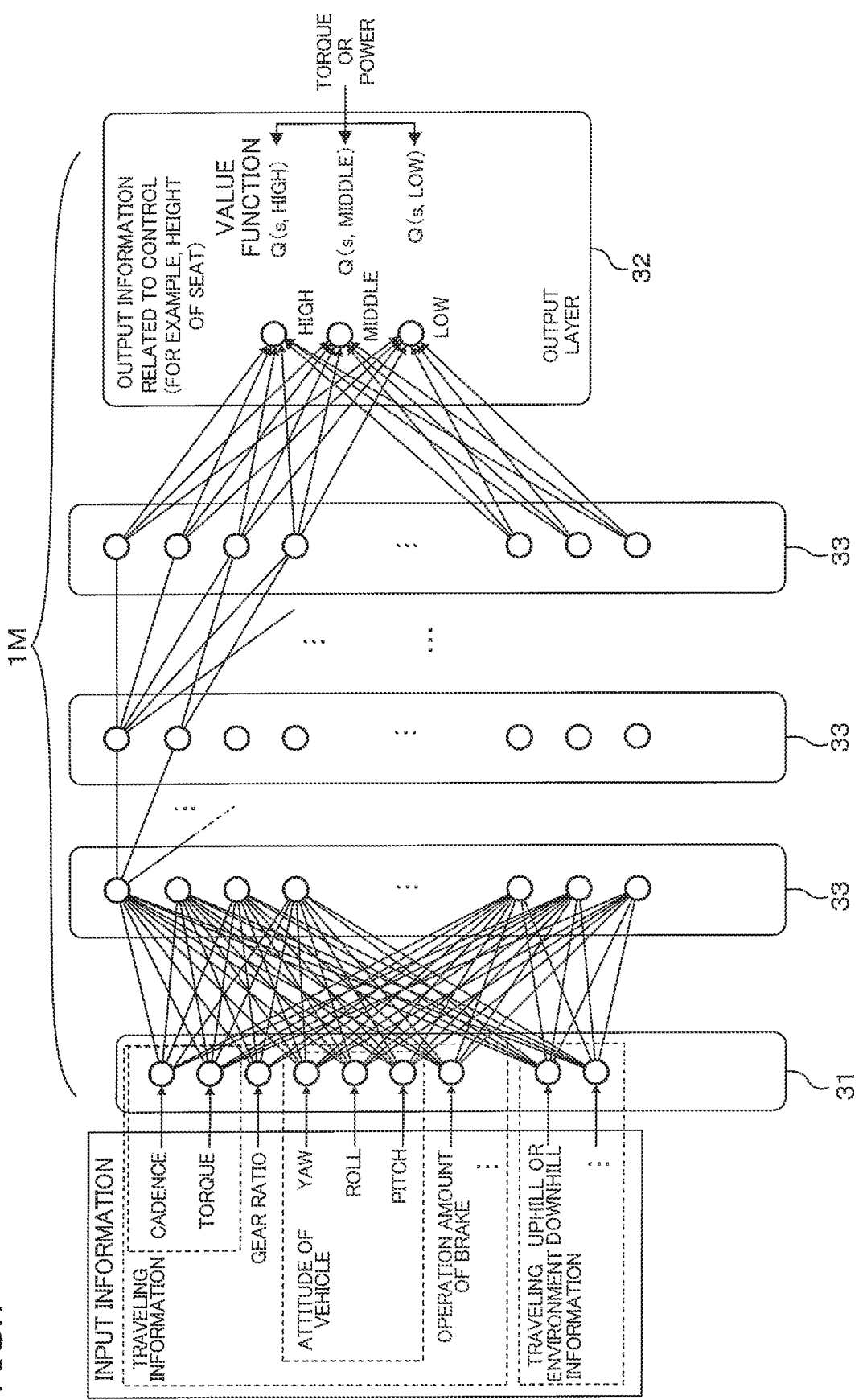
FIG. 7 illustrates the outline of the learning model in the second example.

FIG. 7 illustrates the outline of the learning model 1M in the second example. In the example with reference to FIG. 7, the learning model 1 M from which output information related to control of the seat post F is output will be described. The learning model 1M includes an input layer 31 to be provided with input information related to traveling of the human-powered vehicle A, an output layer 32 providing output information related to control of the seat post F having the telescopic mechanism of the components of the human-powered vehicle A, and an intermediate layer 33 having parameters, where the intermediate layer is configured to learn to improve evaluation of the traveling state of the human-powered vehicle A as the seat post F is controlled in accordance with the output information outputted from the output layer 32. If input information related to traveling is input to the input layer 31, calculation is executed in the intermediate layer 33 using the learned parameters, and output information related to control of the seat post F is output from the output layer 32.

In the example in FIG. 7, the input layer 31 is provided with a cadence obtained from the cadence sensor S2 and a torque obtained from the torque sensor S3. The input layer 31 may be provided with power obtained by calculation using the torque and the cadence.

The input layer 31 may be provided with a gear ratio obtained from the transmission E or the operating device D.

The data of an attitude of the human-powered vehicle A obtained from the angle sensor S4 may be inputted to the input layer 31. The data of the attitude may be information indicating the inclination of the human-powered vehicle A. The inclination is represented by a yaw component having an axis in the vertical direction, a roll component having an axis in the front-back direction of the human-powered vehicle A, and a pitch component having an axis in the right-left direction of the human-powered vehicle A. By inputting the attitude of the human-powered vehicle A, it is expected that the seat post F is controlled to lower the seat A6 at a downhill and raise the seat A6 at an uphill, for example.

An operation amount of the brake obtained from the operating device D including the brake lever as an operating unit D1 may be inputted to the input layer 31. If the operation amount of the brake is large, the seat A6 is automatically lowered to allow for easy pedaling or allow for safety stop when the human-powered vehicle A is stopped.

A video signal obtained from the image sensor S7 may be inputted to the input layer 31. The video signal is not input as it is, but a signal indicating a road surface condition obtained by performing image processing on the video signal may be input to the input layer 31. In other words, the signal indicating the road surface condition is the traveling environment information. The signal indicating the road surface condition is, for example, a signal indicating a road surface condition such as a determination result whether the road is unpaved or paved, a determination result whether the road is uphill or downhill, or whether the road is slippery or not. By classifying ups and downs of the road surface to be traveled from the video signal corresponding to the landscape viewed in the direction of travel, it is possible to control the seat post F by determining whether the seat A6 should be raised or lowered.

Other than the above description, a signal indicating a traveling speed of the human-powered vehicle A obtained from the speed sensor S1 may be inputted to the input layer 31. In the state where stopping with traveling speed equals to or lower than a predetermined speed, the seat post F can be controlled to automatically lower the seat A6.

The output layer 32 outputs the height of the seat A6 for the seat post F. The output layer 32 specifically outputs evaluations for the height of the seat A6 classified into three levels of high, middle and low, i.e., which indicate each protrusion length and the linear movement amount of the seat post F, and the action value which information indicating a height associated with higher ride comfortability. The height of the seat post F may be controlled by the protrusion length or the linear movement amount itself that allows for continuous adjustment, not limited to classification into three levels of high, middle and low. The seat post F may be a product that allows for two level adjustment. The control unit 10 can select the height with the highest evaluation for action in accordance with the evaluations for actions of the output information, and output the protrusion length or the linear movement amount corresponding to the selected height to the seat post F. For the height of the seat A6 output from the output layer 32, a higher evaluation value is given to the height that is associated with smaller torque or less power and with no unnecessary force applied. In accordance with the correspondence between the seat height and the linear movement amount as well as the seat height and the protrusion length, the linear movement amount corresponding to the selected height may be outputted to the seat post F.

In another example, the output layer 32 may output evaluations for actions of the plurality of set position relative to the front-back direction and in the right-left position of the seat A6 for seat post F. In another example, the output layer 32 may output an evaluation for action for each tilt of the seat surface A61 of the seat A6.

As the reinforcement learning progresses, the control information of the seat post F for improving ride comfortability depending on the traveling situation and the road surface condition for the human-powered vehicle A can be obtained by using the learning model 1M.

In the processing procedures shown in the flowcharts in FIG. 3, FIG. 4 and FIG. 6, a consideration is provided for every control period, and the learning is advanced using immediate considerations though not limited thereto. The consideration may be provided by using the power, the torque or the cadence of the second acceleration during a predetermined duration. The information input to the learning model 1M or the NN before learning is numerical values or information obtained from the sensor group S1-S7 every control period. However, numerical values or information obtained from the sensor group S1-S7 over a predetermined period may be provided to the input layer 31. In this case, an image plotting the output from the sensor group S1-S7 on a graph may be provided to the input layer 31.

Figure 8:
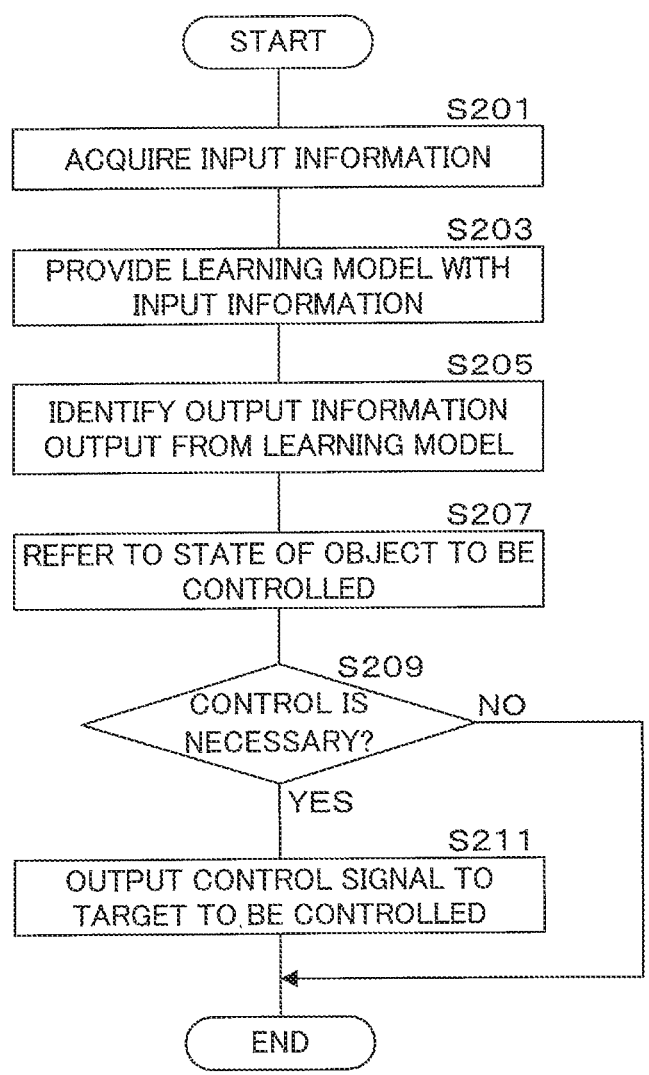
FIG. 8 is a flowchart of one example of a control procedure using the learning model by the control unit.

The control unit 10 of the control device 100 controls the components in accordance with the control information output from the learning model 1M created as described above. FIG. 8 is a flowchart of one example of a control procedure using the learning model 1M by the control device 100. The control unit 10 repeatedly executes the processing procedure shown in the flowchart in FIG. 8. This procedure may be executed at a predetermined control period (30 milliseconds, for example).

The control unit 10 acquires input information related to traveling of the human-powered vehicle A by the input-output unit 14 (step S201). At step S201, the control part 10 refers to each of the signal levels from the sensor group S1-S7 input through the input-output unit 14 every control period, and temporarily stores the signal level in the internal memory of the control unit 10 or a memory integrated in the input-output unit 14.

The control unit 10 provides the input layer 31 of the learning model 1M with the input information acquired at step S201 (step S203). The control unit 10 selects and provides the input information for the suspension G, and selects and provides the input information for the seat post F at step S203.

The control unit 10 identifies the output information related to control of the component to be controlled outputted from the learning model 1M (step S205). The control unit 10 identifies, for example, the height of the seat A6 related to the seat post F output from the learning model 1M as output information at step S205. In another example, the control unit 10 identifies the strength of the spring force of the suspension G output from the learning model 1M as output information.

The control unit 10 refers to the state of the object to be controlled in accordance with the identified output information (step S207). The control unit 10 determines whether or not output of a control signal is necessary in accordance with the relation between the details of the control indicated by the identified output information and the referred state (step S209).

If output of a control signal is necessary being determined at step S209 (S209: YES), the control unit 10 outputs a control signal in accordance with the identified output information related to control to the object to be controlled (step S211), and ends the control processing performed in one control period.

If output of a control signal is not necessary being determined at step S209 (S209: NO), the control unit 10 ends the processing without outputting a control signal in accordance with the identified output information related to control to the object to be controlled. Thus, the determination process of steps S207 and S209 can be omitted.

The control unit 10 may execute the process shown in the flowchart in FIG. 8 for each of the seat post F and the suspension G, or may execute the process step S201 in common, and may select and provide different information for each of the component at step S203.

If the suspension G or the seat post F is automatically controlled, the control device 100 may use a speaker as a notification unit for notifying the user being a rider of the details of the control, and the control unit 10 may output beeper sounds, guidance sounds or the like to the speaker. The control device 100 may output the details of the control to a cycle computer, which is mounted on the handlebar A2a, having a display serving as a notification unit for notifying the user of the details of the control. Notification of the details of the control allows the user to recognize the details of the control of the components related to traveling of the human-powered vehicle A, and achieving automatic control without causing discomfort is possible.

Embodiment 2

Figure 9:
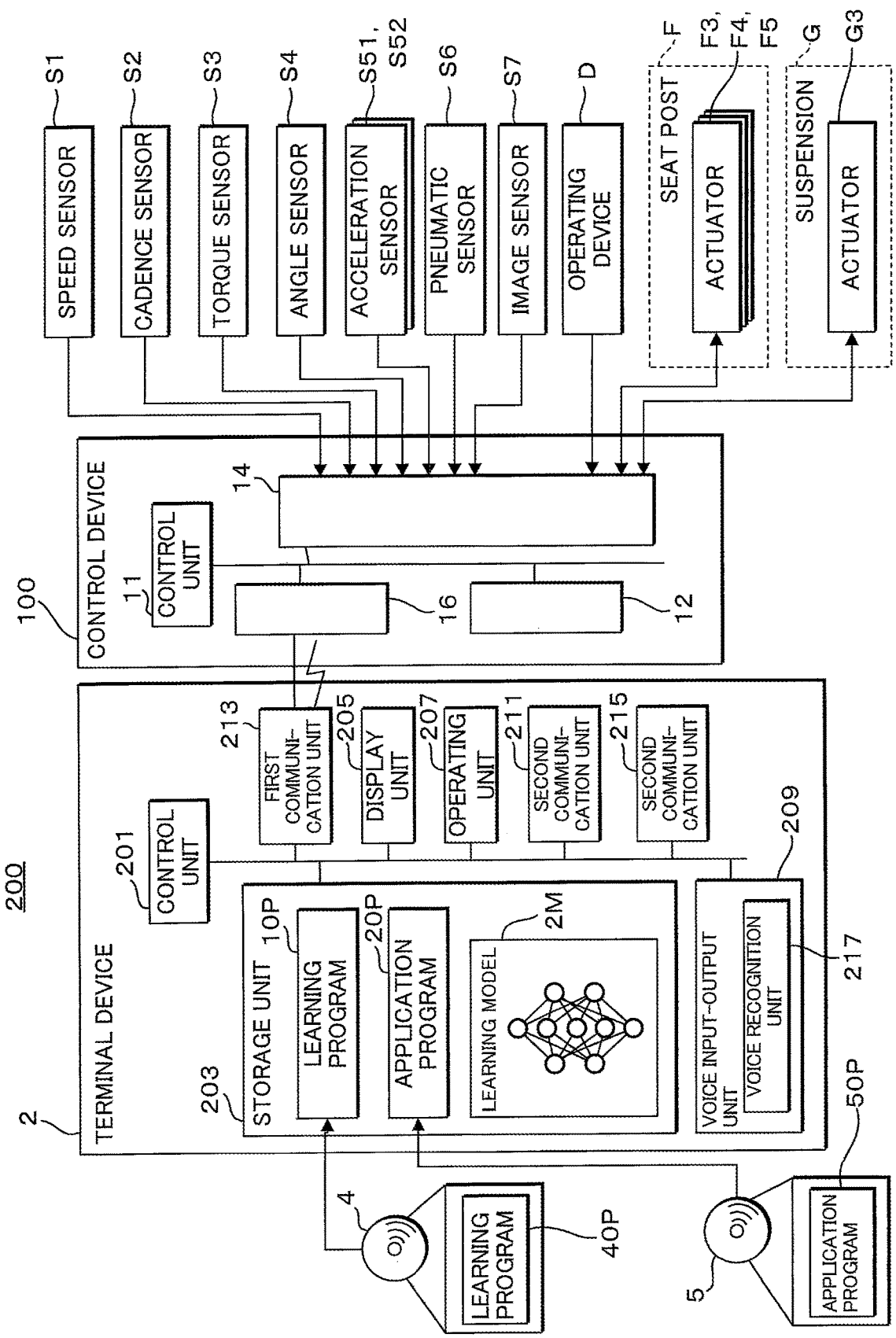
FIG. 9 is a block diagram illustrating the configuration of a control system according to Embodiment 2.

In Embodiment 2, processing of creating the learning model 1M and outputting component control information is executed by a terminal device of the user instead of the control device 100. FIG. 9 is a block diagram illustrating the configuration of a control system 200 according to Embodiment 2. The control system 200 includes a terminal device 2 and the control device 100. The control device 100 in Embodiment 2 includes a control unit 11, a storage unit 12, an input-output unit 14 and a communication unit 16. Some of the components of the control device 100 in Embodiment 2 common to those of the control device 100 in Embodiments 1 will be denoted by the same reference codes, and detailed description thereof will not be repeated.

The control unit 11 of the control device 100 in Embodiment 2, which includes processing circuitry, e.g. a processor utilizing a CPU, executes processing by controlling each of the components with the use of a memory such as a built-in ROM, RAM and so on. The control unit 11 does not execute the learning process performed by the control unit 10 of the control device 100 in Embodiment 1. The control unit 11 receives a signal input from the sensor group S1-S7 mounted on the human-powered vehicle A through the input-output unit 14, and transmits the input signal to the terminal device 2 via the communication unit 16. The control unit 11 refers to a control state of the operating device D and an operation signal output from the operating device D, and transmits them to the terminal device 2 through the communication unit 16. The control unit 11 input a control signal to the seat post F or the suspension G to be controlled in accordance with the operation signal output from the operating device D or an instruction output from the terminal device 2.

The terminal device 2 is a portable compact communication terminal device to be used by the user. The terminal device 2 is a cycle computer in the first example. The terminal device 2 may be a communication terminal device such as a so-called junction box that is connected to the components of the human-powered vehicle A via wire or wireless connection in the second example. The terminal device 2 is a smartphone in the third example. The terminal device 2 is a wearable device such as a smartwatch or the like in the fourth example. For the cycle computer or the smartphone, a holding member used for a cycle computer or a smartphone may be attached to the handlebar A2 of the human-powered vehicle A, and the cycle computer or the smartphone may be used while being put on the holding member (see FIG. 10).

The terminal device 2 includes a control unit 201, a storage unit 203, a display unit 205, an operating unit 207, a voice input-output unit 209, a GPS receiver 211, a first communication unit 213 and a second communication unit 215.

The control unit 201 includes processing circuitry, e.g. a processor such as a CPU, a GPU, and a memory and so on. The control unit 201 may be constituted as a single hardware (SoC: System On a Chip) integrated with the processor, the memory, the storage unit 203, the first communication unit 213 and the second communication unit 215. The control unit 201 executes learning of the output information related to control of the human-powered vehicle A and component control in accordance with the learning according to an application program 20P stored in the storage unit 203.

The storage unit 203 includes a non-volatile memory such as a flash memory, for example. The storage unit 203 stores a learning program 10P and the application program 20P. The learning program 10P may be included in the application program 20P. The storage unit 203 stores a learning model 2M created by the process performed by the control unit 201. The storage unit 203 stores data to which the control unit 201 refers. The learning program 10P may be obtained by reading out a learning program 40P stored in a recording medium 4 and copying it in the storage unit 203. The application program 20P may be obtained by reading out an application program 50P stored in a storage medium 5 and copying it in the storage unit 203.

The storage unit 203 stores map information. The map information includes elevation information of roads and information regarding whether a road is unpaved or paved, or the like. The control unit 201 can identify traveling environment information of the human-powered vehicle A corresponding to the map information whether the road is uphill or downhill, or whether the road is unpaved or not from the position of the terminal device 2 obtained from the GPS receiver 211, that is, the position of the human-powered vehicle A with reference to the map information stored in the storage unit 203.

The display unit 205 includes a display device such as a liquid crystal panel, an organic electroluminescence (EL) display, or the like. The display unit 205 is a notification unit for notifying the user of the details of the control performed on the seat post F or the suspension G.

The operating unit 207 is an interface for accepting operation by the user and includes a physical button and a display-integrated touch panel device. The operation unit 207 can accept operation performed on the screen displayed by the display unit 205 through the physical button or the touch panel.

The voice input-output unit 209 includes a speaker, a microphone and so on. The voice input-output unit 209 is provided with a voice recognition unit 217 and is able to accept operation by recognizing the details of operation from voice input through the microphone. The voice input-output unit 209 is a notification unit for notifying the user of the details of the control performed on the seat post F or the suspension G by generating voice or beep sounds from the speaker. The voice input-output unit 209 may have a function of outputting vibration of a specific pattern to thereby vibrate the terminal device 2 as a whole or the display surface of the display unit 205.

The GPS receiver 211 is a communication unit to receive a global positioning system (GPS) signal. The GPS receiver 211 is provided to obtain position information (longitude and latitude information) of the terminal device 2. The GPS receiver 211 may assist calculation of the position information using the strength of the reception of the electric wave according to the wireless communication standard such as Wi-Fi, Bluetooth (registered trademark) or the like.

The first communication unit 213 is a communication module that corresponds to the communication unit 16 of the control device 100. The first communication unit 213 is a USB communication port in the first example. The first communication unit 213 is a short range wireless communication module in the second example.

The second communication unit 215 is a wireless communication module for transmitting and receiving information to and from another communication equipment (not shown) through a public communication network or according to a predetermined mobile communication standard. The second communication unit 215 employs a network card, a wireless communication device or a carrier communication module. The control unit 201 can acquire weather information from another communication equipment by the second communication unit 215. The control unit 201 can acquire the information about the weather as traveling environment information of the human-powered vehicle A in accordance with the position of the terminal device 2 obtained by the GPS receiver 211, that is, the position information of the human-powered vehicle A.

In Embodiment 2, the control device 100 continuously acquires input information obtained from the sensor group S1-S7 mounted on the human-powered vehicle A through the input-output unit 14, and transmits the input information to the terminal device 2 via the communication unit 16.

The control unit 201 of the terminal device 2 operates in an automatic control mode using the learning model 2M created in advance and in a re-learning mode which the learning model 2M is updated for the rider. In the case of the automatic control mode, the control unit 201 controls the seat post F in accordance with the information related to control of the seat post F that is output by providing input information to the learning model 2M for the seat post F. In the case of the automatic control mode, the control unit 201 controls the suspension G in accordance with the information related to control of the suspension G that is output by providing input information to the learning model 2M for the suspension G. The creating method of the learning model 2M created in advance is similar to the creating method of the learning model 1M for the seat post F or the creating method of the learning model 1M for the suspension G that are described in Embodiment 1 and thus the description thereof will not be made.

The processing by the control unit 201 in the automatic control mode is similar to the details of the processing by the control device 100 in Embodiment 1 shown by the flowchart in FIG. 8, and thus the detailed description thereof will not be made.

Figure 10:
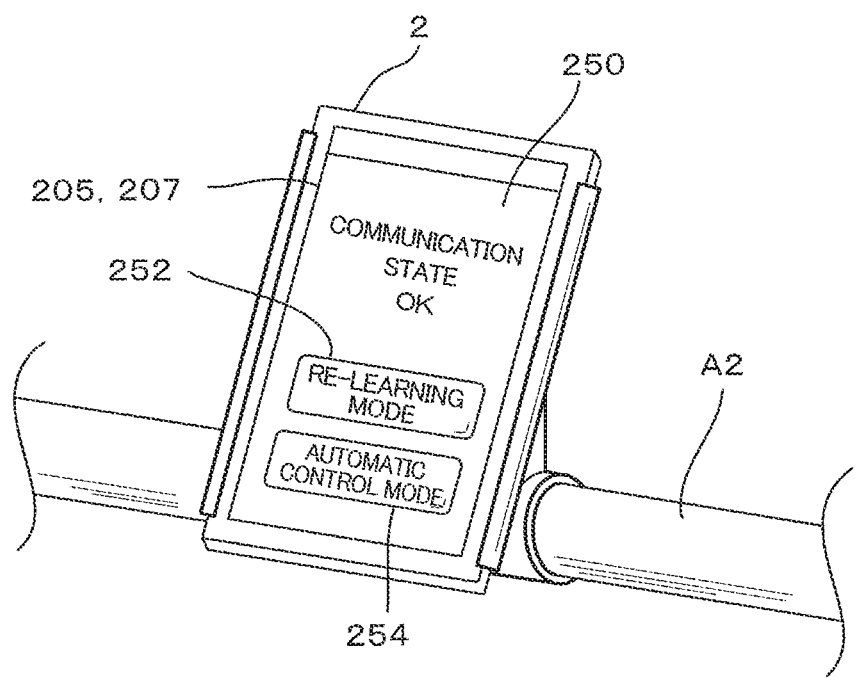
FIG. 10 is an example of a screen displayed in accordance with an application program.
Figure 11:
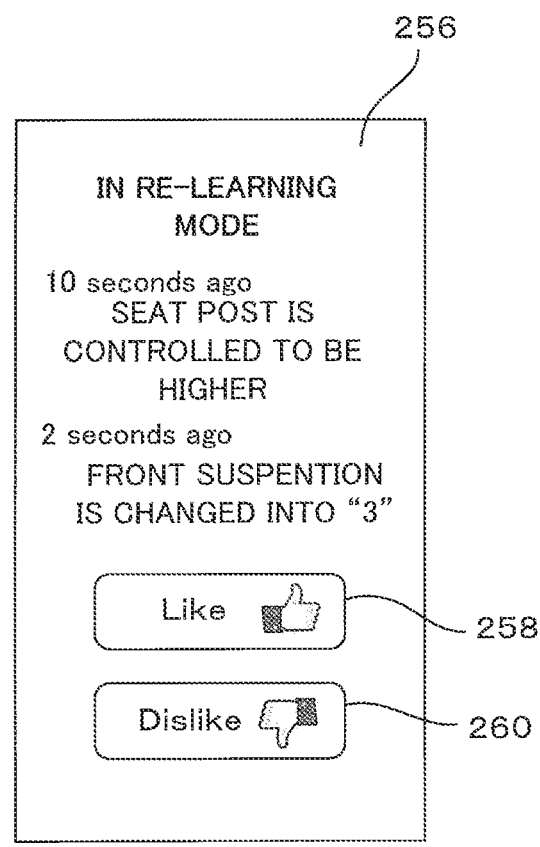
FIG. 11 is an example of a screen displayed in accordance with an application program.

The following describes the re-learning mode for updating the learning model 2M in accordance with evaluations. FIGS. 10 and 11 show examples of screens displayed in accordance with the application program 20P. In the example illustrated in FIG. 10, the terminal device 2 is a cycle computer and attached to the handlebar A2 so as to allow the user to view the display unit 205. FIG. 10 shows a main screen 250 displayed on the display unit 205 in accordance with the application program 20P. The control unit 201 set the display unit 205 to display the main screen 250 in accordance with the application program 20P. The control unit 201 establishes communication with the control device 100 in accordance with the application program 20P. On the main screen 250, respective selection buttons 252 and 254 for the re-learning mode and the automatic control mode are included. The control unit 201 starts the operation in the re-learning mode if the selection button 252 is selected whereas the control unit 201 starts the operation in the automatic control mode if the selection button 254 is selected.

FIG. 11 is an example of the content of a re-learning mode screen 256 to be displayed if the selection button 252 for the re-learning mode is selected. The re-learning mode screen 256 is a notification unit for displaying a message indicating details of the control when the control unit 201 controls the component having a telescopic mechanism such as the seat post F, the suspension G or the like. The re-learning mode screen 256 includes a high evaluation button 258 and a low evaluation button 260. The high evaluation button 258 and the low evaluation button 260 correspond to the first example of the evaluation unit. The control unit 201 recognizes selection of the high evaluation button 258 and the low evaluation button 260 through the operation unit 207, and accepts the evaluation. The high evaluation button 258 in the example shown in FIG. 11 is selected if control in accordance with the learning model 2M is not comfortable. The control unit 201 recognizes which one of the buttons 258 and 260 is selected, and recognizes the accepted details of evaluation. As an evaluation unit, only the low evaluation button 260 may be displayed.

In the second example, the evaluation unit may be a physical button provided on the operating unit D1. A specific evaluation acceptance button may be provided on the operating unit D1. An evaluation acceptance button may separately be provided close to the operating device D.

In the third example, the evaluation unit is a voice recognition unit 217 of the voice input-output unit 209. The control unit 201 recognizes voice of the user by the voice recognition unit 217, thereby accept an evaluation. The control unit 201 determines whether or not control is comfortable in accordance with the voice recognition. If the control is comfortable, high evaluation is assumed.

In the fourth example, the evaluation unit identifies facial expressions from an image obtained by photographing the face of the user being a rider with the camera and determines whether the control is comfortable in accordance with the specified facial expressions, thereby accept an evaluation in accordance with whether the control is comfortable or not.

Figure 12:
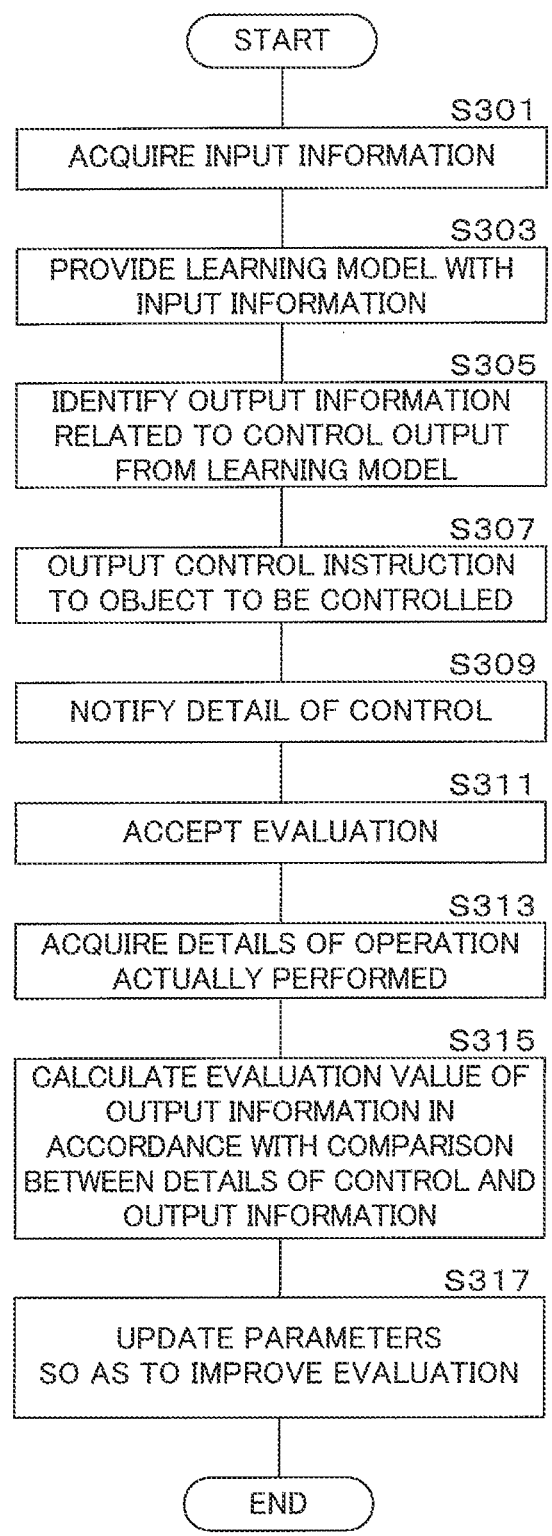
FIG. 12 is a flowchart of one example of a processing procedure of a re-learning processing procedure performed by a control unit in Embodiment 2.

FIG. 12 is a flowchart of one example of the processing procedure for re-learning performed by the control unit 201 in Embodiment 2. If the selection button 252 for the re-learning mode is selected, the control unit 201 executes the following process at a predetermined control period (30 milliseconds, for example) until the automatic control mode is selected. In the flowchart in FIG. 12, the procedure regarding the seat post F as an object to be controlled will be shown.

The control unit 201 acquires input information related to traveling of the human-powered vehicle A obtained from the control device 100 through the first communication unit 213 (step S301). At step S301, the control unit 201 acquires signal levels obtained by the control unit 10 of the control device 100 referring to the signal levels from the sensor groups S1-S7 for every control period, and temporarily storing them in the internal memory of the control unit 10 or the memory integrated in the input-output unit 14.

The control unit 201 provides the learning model 2M with the input information acquired at step S301 (step S303) and identifies output information related to control of the component output from the learning model 2M (step S305).

The control unit 201 outputs a control instruction in accordance with the output information identified at step S305 to the control device 100 (step S307), and displays the details of the control on the display unit 205, thereby notify the user of the details of the control (step S309).

The control unit 201 accepts an evaluation by the user within a predetermined time period after the control process (step S311). At step S311, the control part 201 accepts an evaluation using the high evaluation button 258 and the low evaluation button 260 on the re-learning mode screen 256 as shown in FIG. 10 and FIG. 11.

The control unit 201 acquires the details of operation actually performed using the operating unit D1 of the operating device D from the control device 100 (step S313). The control unit 201 calculates an evaluation value in accordance with the comparison between the information related to the control of the component corresponding to the details of the control acquired at step S313 and the output information identified at step S305 (step S315). The control unit 201 calculates a higher evaluation value as the difference between the information acquired at step S311 and the output information specified at step S305 decreases.

The control unit 201 uses the details of the evaluation accepted at step S311 and the evaluation value calculated at step S315 as a consideration for the output information identified at step S305, updates the parameters in the intermediate layer of the learning model 2M so as to improve the evaluation from the user (step S317) and then ends the processing.

The processing at the steps S313 and S315 may be performed only when the details of the evaluation accepted at step S311 corresponds to a low evaluation.

The control unit ends the re-learning mode when the user selects the selection button 254 for the automatic control mode, or the probability of the evaluation accepted at step S311 being high is equal to or larger than a predetermined ratio, or the evaluation value calculated at step S315 falls within the range set in advance. The control unit 201 may execute the procedure of the flowchart in FIG. 12 for a predetermined time period after the selection button 252 for re-learning mode is selected.

The re-learning processing described in Embodiment 2 allows the terminal device 2 and the control device 100 to achieve automatic control of the telescopic mechanism according to the riding characteristics and the preference of the user being the rider of the human-powered vehicle A.

Embodiment 3

The configuration of the control system 200 in Embodiment 3 is similar to the configuration thereof in Embodiment 2 except for that the learning model 2M is prepared for each of the traveling courses which the human-powered vehicle A travels. Some of the components of the control system 200 in Embodiment 3 common to those in Embodiments 1 and 2 will be denoted by the same reference codes, and detailed description thereof will not be repeated.

Figure 13:
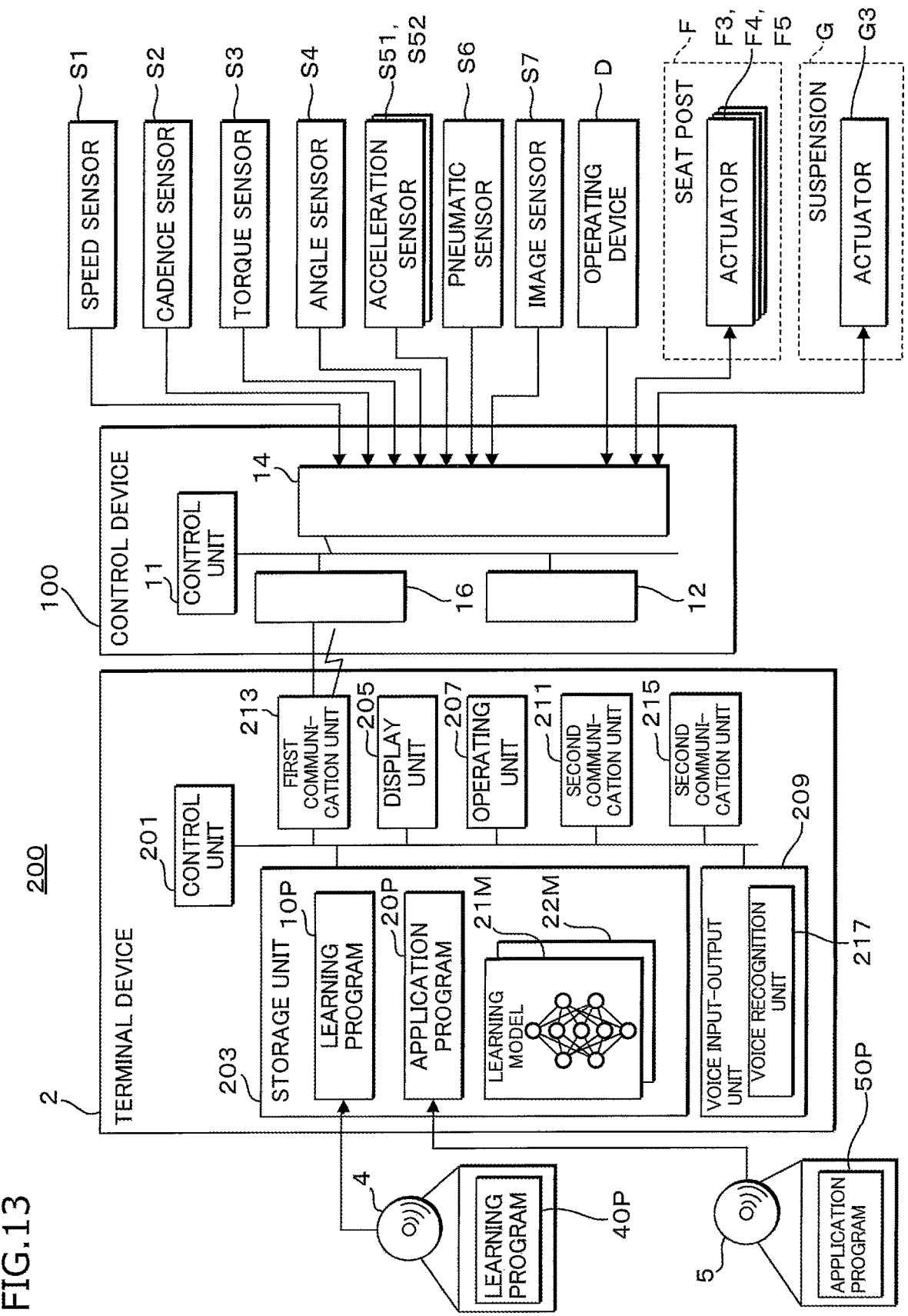
FIG. 13 is a block diagram illustrating the configuration of a control system according to Embodiment 3.

FIG. 13 is a block diagram showing the configuration of the control system 200 according to Embodiment 3. In Embodiment 3, multiple learning models 21M and 22M are stored in the storage unit 203 of the terminal device 2 as illustrated in FIG. 13. The multiple learning models 21M and 22M are models created and prepared by the process shown in the flowchart of FIG. 3, FIG. 4 or FIG. 5 of Embodiment 1 under different test run environments. In the first example, the different test run environment is a travel course which the human-powered vehicle A travels. The learning models 21M and 22M are prepared for the respective different travel courses which the human-powered vehicle A travels and are stored in the storage unit 203. It may be configured to make a model corresponding to a different traveling environment selectable, not limited to a traveling course. The user can select any one of the learning models 2M from an external server using the terminal device 2, download it into the terminal device 2 and store it in the storage unit 203. The control unit 201 may accept operation from the user and accept a setting with a name corresponding to the stored learning model 2M.

Figure 14:
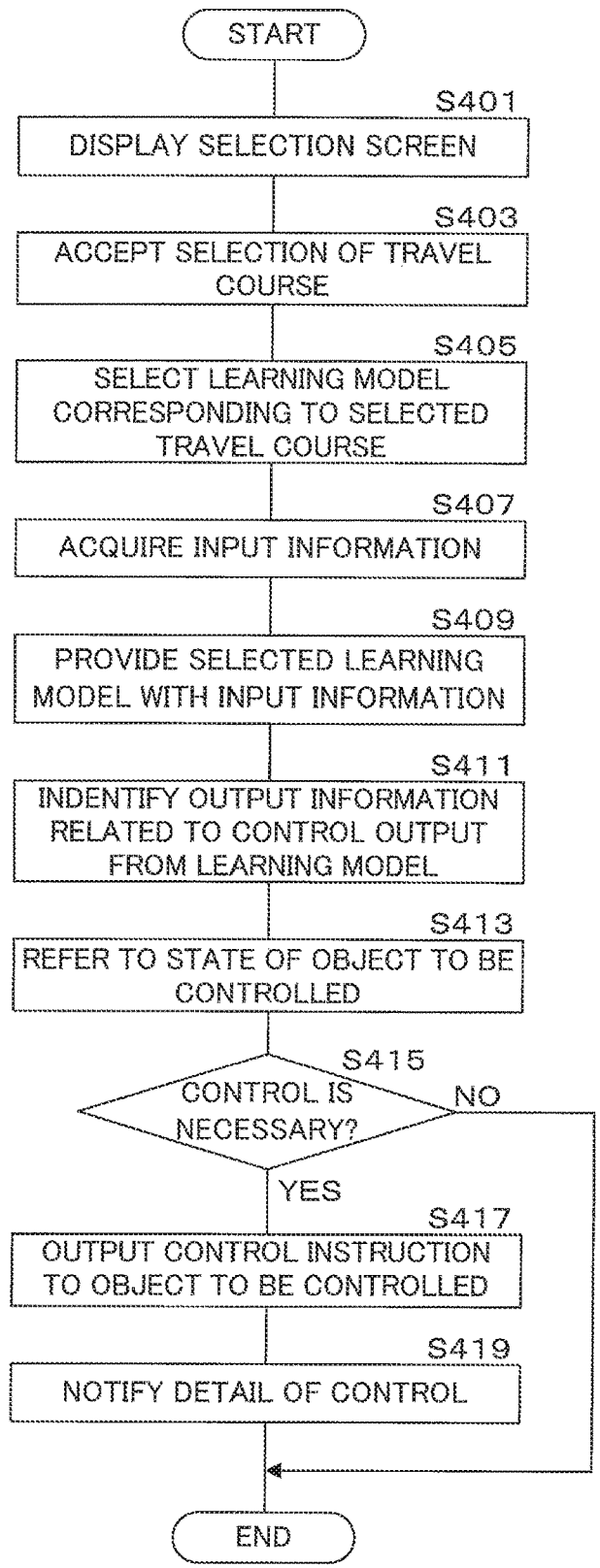
FIG. 14 is a flowchart of one example of a control procedure using a learning model by a terminal device 2 according to Embodiment 3.

Automatic control performed when the learning model 21M or 22M for each of the different travel courses is appropriately selected will be described below. FIG. 14 is a flowchart of one example of a control procedure using the learning model 21M or 22M by the terminal device 2 according to Embodiment 3.

Figure 15:
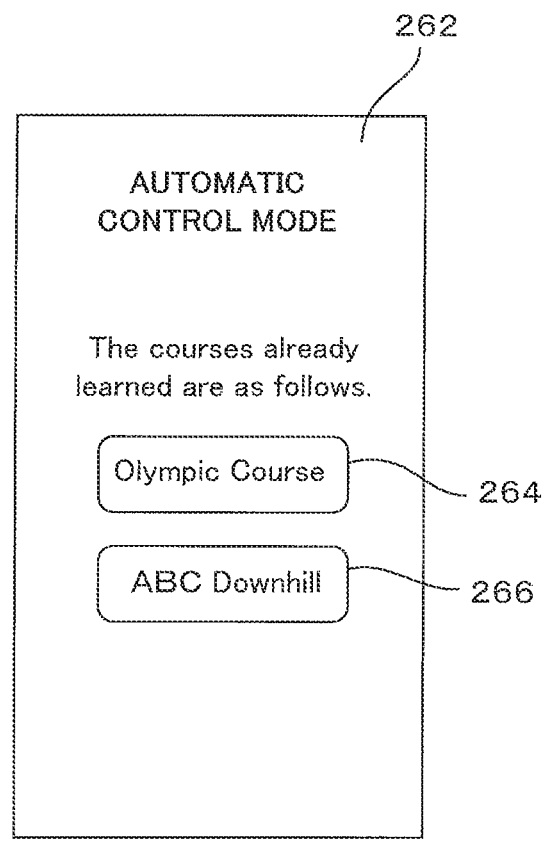
FIG. 15 is an example of the content of a selection screen.

The control unit 201 displays a selection screen for the travel course on the display unit 205 (step S401) and accepts selection of a travel course on the selection screen (step S403). FIG. 15 is an example of the content of the selection screen. The selection screen 262 includes selection buttons 264 and 266 for multiple travel courses as shown in FIG. 15. The control unit 201 can recognize which one of the selection buttons 264 and 266 is selected through the operating unit 207. The control unit 201 selects a learning model corresponding to the travel course selected at step S403 from the multiple learning models 21M, and 22M stored in the storage unit 203 as shown in FIG. 15 (step S405).

The control unit 201 acquires information related to traveling of the human-powered vehicle A obtained from the control device 100 through the first communication unit 213 (step S407).

The control unit 201 provides the learning model 21M or 22M selected at step S405 with the input information acquired at step S407 (step S409) and identifies output information related to control of the component output from the selected learning model 21M or 22M (step S411).

The control unit 201 acquires the state of the object to be controlled in accordance with the identified output information from the control device 100 (step S413). The control unit 201 determines whether or not output of a control signal is necessary in accordance with the relation between the details of the control indicated by the identified output information and the referred state (step S415).

If it is determined that output of a control signal is necessary at step S415 (S415: YES), the control unit 201 outputs a control instruction in accordance with the output information identified at step S411 to the control device 100 (step S417). The control unit 201 causes the display unit 205 to display the details of the control, thereby notify the user of the details of the control (step S419) and ends the process.

If it is determined that output of a control signal is not necessary at step S415 (S415: NO), the control unit 201 ends the process without outputting a control instruction in accordance with the identified output information related to control. Thus, the determination processes at steps S413 and S415 can be omitted.

Hence, automatic control of the telescopic mechanism suited for each of the travel courses depending on various situations or running environments in accordance with variety of input information can be achieves by training the learning model 21M or 22M for each of the different traveling environments.

The terminal device 2 according to Embodiment 3 may re-train each of the learning models 21M and 22M as illustrated in Embodiment 2.

Thus, by using the learning models 1M, 2M, or 21M and 22M, the control device 100 is not required to compare numerical values of the traveling information obtained from the multiple sensors S1-S7 and thresholds, and execute each of determinations in accordance with the comparison results. The control device 100 enables appropriate automatic control according to human senses while systematically and naturally taking the input information related to the traveling of the human-powered vehicle A obtained from the multiple sensors S1-S7 into account.

DESCRIPTION OF REFERENCE CHARACTERS 100 control device
10 control unit
12 storage unit
1M learning model
1P learning program
2P control program
2 terminal device (control device)
201 control unit
203 storage unit
2M, 21M, 22M learning model
10P learning program
20P application program
A12 frame
A2 handlebar
A5 front fork
A6 seat
A61 seat surface
F seat post
F1 main post body
F2 head
F3, F4, F5 actuator
G suspension
G1 first member
G2 second member
G3 actuator
S1 speed sensor
S2 cadence sensor
S3 torque sensor
S4 angle sensor
S5 acceleration sensor
S51 first acceleration sensor
S52 second acceleration sensor
S6 pneumatic sensor
S7 image sensor

The invention claimed is:

1. A control device comprising:
a control unit including processing circuitry configured to control a telescopic mechanism in accordance with an output information related to controlling the telescopic mechanism; and
an evaluation unit configured to evaluate the output information, wherein
the output information is outputted from a trained machine learning model in association with an input information related to a traveling of a human-powered vehicle; and
the trained machine learning model is updated in accordance with an evaluation by the evaluation unit.

2. The control device according to claim 1, wherein
the telescopic mechanism is a suspension of the human-powered vehicle, and
the output information includes at least one of a stroke length, a locked state, a spring force, and a damping rate.

3. The control device according to claim 2, wherein
the suspension includes a first member and a second member movably mounted to the first member, and
the input information includes a first acceleration outputted by a first acceleration sensor provided to the first member, and a second acceleration outputted by a second acceleration sensor provided to the second member.

4. The control device according to claim 3, wherein
the learning model outputs the output information such that a difference between the first acceleration and the second acceleration falls within a predetermined range.

5. The control device according to claim 1, wherein
the telescopic mechanism is a seat post of the human-powered vehicle, and
the output information includes at least one of a seat height, an inclination of a seat surface, a position in a front-back direction, and a position in a right-left direction.

6. The control device according to claim 1, wherein
the input information includes at least one of a traveling information of the human-powered vehicle and a traveling environment information of the human-powered vehicle.

7. The control device according to claim 6, wherein
the traveling information includes at least one of a traveling speed of the human-powered vehicle, an acceleration of the human-powered vehicle, an attitude of the human-powered vehicle, a cadence of a crank of the human-powered vehicle, a driving force of the human-powered vehicle, a load balance of the human-powered vehicle, a gear ratio of the human-powered vehicle, an operation amount of a brake of the human-powered vehicle, and a physical information of a user.

8. The control device according to claim 6, wherein
the traveling environment information of the human-powered vehicle includes at least one of a ground contact state of wheels, a road surface condition, a position information, and weather.

9. The control device according to claim 1, wherein
the control unit outputs details of controlling the telescopic mechanism to a notification unit which notifies a user of the details.

10. The control device according to claim 1, wherein
the evaluation unit evaluates the output information in accordance with a post-control input information when the input information is obtained after the control unit controls the telescopic mechanism.

11. The control device according to claim 10, further comprising:
an operation unit that accepts a predetermined operation related to the output information, wherein
the output information is evaluated in accordance with a comparison between a post-control output information outputted from the learning model in accordance with the post-control input information and the predetermined operation.

12. The control device according to claim 1, wherein
the learning model is prepared for each traveling course the human-powered vehicle travels and accepts a selection of a traveling course, and
the control unit controls the telescopic mechanism in accordance with the output information in association with the input information from the learning model corresponding to the selected traveling course.

13. A method of creating a learning model comprising:
employing, in a case where an input information related to a traveling of a human-powered vehicle is inputted, a neural network that outputs an output information related to controlling a telescopic mechanism of components of the human-powered vehicle;
acquiring the input information related to the traveling of the human-powered vehicle;
identifying the output information outputted by providing the neural network with the acquired input information; and
learning, when the telescopic mechanism is controlled in accordance with the identified output information, parameters in an intermediate layer of the neural network by a computer so as to improve an evaluation of a traveling state of the human-powered vehicle.

14. A processor configured to execute a learning model, the learning model comprising:
an input layer to be provided with an input information related to a traveling of a human-powered vehicle;
an output layer providing an output information related to controlling a component of the human-powered vehicle, the component having a telescopic mechanism; and
an intermediate layer having parameters being configured to learn to improve an evaluation of a traveling state of the human-powered vehicle as the component is being controlled in accordance with the output information outputted from the output layer, wherein
the learning model is configured to execute a calculation in the intermediate layer as the input information is being inputted to the input layer, and to output an information related to controlling the component from the output layer.

15. A computer-readable storage medium comprising instructions configured to be executed by a processor of a computer, the instructions including:
employing, in a case where an input information related to a traveling of a human-powered vehicle is inputted, a neural network that outputs an output information related to controlling a component having a telescopic mechanism of components of the human-powered vehicle;
acquiring the input information related to the traveling of the human-powered vehicle;
identifying the output information outputted by providing the neural network with the acquired input information; and
learning, in a case where the component is controlled in accordance with the identified output information, parameters in an intermediate layer of the neural network so as to improve an evaluation of a comfortability by a rider of the human-powered vehicle.

16. A control device comprising:
a control unit including processing circuitry configured to control a telescopic mechanism in accordance with an output information related to controlling the telescopic mechanism, wherein
the output information is outputted from a trained machine learning model in association with an input information related to a traveling of a human-powered vehicle,
the telescopic mechanism is a suspension of the human-powered vehicle,
the output information includes at least one of a stroke length, a locked state, a spring force, and a damping rate,
the suspension includes a first member and a second member movably mounted to the first member, and
the input information includes a first acceleration outputted by a first acceleration sensor provided to the first member, and a second acceleration outputted by a second acceleration sensor provided to the second member.

17. The control device according to claim 16, wherein
the learning model outputs the output information such that a difference between the first acceleration and the second acceleration falls within a predetermined range.

18. The control device according to claim 16, wherein
the control unit outputs details of controlling the telescopic mechanism to a notification unit which notifies a user of the details.

* * * * *